(12) United States Patent
Feague et al.

(10) Patent No.: US 7,245,483 B2
(45) Date of Patent: Jul. 17, 2007

(54) INTEGRATED PERSONAL INFORMATION MANAGEMENT SYSTEM

(75) Inventors: Roy W. Feague, Scotts Valley, CA (US); Stephen J. Fricke, Felton, CA (US); Gary R. Snyder, Santa Cruz, CA (US); Kristina A. Ross, Oakland, CA (US); J. Phillip Rose, Santa Cruz, CA (US)

(73) Assignee: Satori Labs, Inc., Scotts Valley, CA (US)

( * ) Notice: Subject to any disclaimer, the term of this patent is extended or adjusted under 35 U.S.C. 154(b) by 555 days.

(21) Appl. No.: 10/707,948

(22) Filed: Jan. 27, 2004

(65) Prior Publication Data

US 2005/0013104 A1    Jan. 20, 2005

Related U.S. Application Data

(60) Provisional application No. 60/481,106, filed on Jul. 18, 2003.

(51) Int. Cl.
*H05K 5/00* (2006.01)
(52) U.S. Cl. ........................................ 361/683; 361/115
(58) Field of Classification Search ................ 361/115, 361/683; 707/203
See application file for complete search history.

(56) References Cited

U.S. PATENT DOCUMENTS 6,962,450 B2 *   11/2005   Brouhon et al. .............. 400/76
7,082,444 B2 *   7/2006    Braun et al. ................. 707/203

OTHER PUBLICATIONS

Hewlett-Packard, HP IPAQ h4350/h4355 Pocket PC QuickSpecs, North America, Version 3, Nov. 20, 2003.
Hewlett-Packard, HP IPAQ Pocket PC h5500 Series QuickSpecs, North America, Version 5, Aug. 22, 2003.
Hewlett-Packard, HP IPAQ PocketPC h1940 QuickSpecs, North America, Version 6, Jul. 11, 2003.
Hewlett-Packard, HP iPAQ Pocket PC h2200 Series QuickSpecs, North America, Version 5, Jul. 11, 2003.
Microsoft Corporation, Customize Tablet PC Input Panel for Improved Handwriting Recognition, Microsoft Windows XP Table PC Edition, Posted on Microsoft.com dated Nov. 7, 2002.
Microsoft Corporation, New Ways to Interact with Your PC, Microsoft Windows XP Table PC Edition, Posted on Microsoft.com dated Nov. 7, 2002.
Microsoft Corporation, New Tools to Use with Your PC, Microsoft Windows XP Table PC Edition, Posted on Microsoft.com dated Nov. 7, 2002.

(Continued)

*Primary Examiner*—Stephen W. Jackson
(74) *Attorney, Agent, or Firm*—Fenwick & West LLP

(57) ABSTRACT

An integrated personal information management system is described. In one embodiment, for example, an integrated personal information management system is described that comprises: a receptacle holding at least one paper page that is capable of receiving pen strokes from a digital pen; a digital pen for recording pen strokes when a user writes on a particular paper page; a page identifier for identifying the particular paper page on which the user is writing; and a handheld personal information device in communication with the digital pen and page identifier for processing the recorded pen strokes associated with the particular paper page and displaying the processing results on a display screen.

61 Claims, 11 Drawing Sheets

OTHER PUBLICATIONS

FranklinCovey, 1Scribe Digital Writing System Digital Address/Phone Pages, FranklinCovey, Web product description, Sep. 18, 2002.

FranklinCovey, 1Scribe Digital Writing System, Logitech io Personal Digital Pen, FranklinCovey, Web product description, Sep. 18, 2002.

Seiko Instruments USA, Inc., InkLink Handwriting System, Seiko Instruments USA, Inc., Business and Office Products, Web product description, Mar. 28, 2002.

Seiko Instruments USA, Inc., InkLink Handwriting System, Quick Start Guide, Seiko Instruments USA, Inc., Mar. 28, 2002.

Seiko Instruments USA, Inc., SmartPad for Pocket PC, Seiko Instruments USA, Inc. Business and Home Office Products, Web product description, Jun. 12, 2000.

Seiko Instruments USA, Inc., SmartPad, The Connected Notepad, Seiko Instruments USA, Inc., Business and Home Office Products, Web product description, Jun. 12, 2000.

Seiko Instruments USA, Inc., SmartPad Quick Start Guide, Seiko Instruments USA, Inc., Jun. 12, 2000.

* cited by examiner

EXAMPLE PAPER PAGE 550

FIG. 5B

INTEGRATED PERSONAL INFORMATION MANAGEMENT SYSTEM

CROSS REFERENCE TO RELATED APPLICATIONS

The present application is related to and claims the benefit of priority of the following commonly-owned, presently-pending provisional application(s): application Ser. No. 60/481,106 filed Jul. 18, 2003, entitled "Integrated Personal Information Management System", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, created: Dec. 11, 2003, 9:23 am, size: 47.1 KB; Object ID: File No. 1; Object Contents: Source Code.

BACKGROUND OF INVENTION

1. Field of the Invention

This invention relates generally to personal information management systems and more particularly to an integrated personal information management system including a paper planner, a personal digital assistant (PDA), and a digital pen.

2. Description of the Background Art

The term "personal information manager" or "PIM" is often used to refer to software or other tools or systems that are used to manage an individual's calendar, contact information (address/phone book), task lists, and notes. In this document, the term "personal information manager" or "PIM" is used in a broader sense to indicate any tool or system that an individual uses to help with the management of his or her calendar, contact information, notes, task lists, and other personal and/or business information.

There are three broad categories of PIMs on the market today. The first category is paper-based planners (sometimes referred to herein simply as "planners"). Planners are traditional paper-based calendar and contact management systems, as exemplified by the Franklin Planner system, the Day-Timer System, and the Day Runner planner system.

The second category is personal digital assistants, or PDAs, which are small handheld computers, typically having a touch-sensitive screen and a stylus which is used for input. The term "PDA" (or "personal digital assistant") generally applies to a stand-alone handheld computing device used primarily for managing calendar, contacts, tasks, notes, e-mail, and the like. Examples of PDAs are the Palm computer from Palm, Inc. and the iPAQ Pocket PC from Hewlett Packard. PDAs can be used to store, display, and/or manipulate various personal information including, but not limited to contact information, calendar information, and the like. Such information can be downloaded from other computer systems, or can be input by way of a stylus on a pressure sensitive screen of the PDA or by way of other types of input devices such as mechanical keyboards or voice recognition modules. More recently, a new generation of cell phones with certain PIM capability has been introduced into the market. As these new cell phones (known as "smartphones") include many of the features of PDAs, for purposes of this discussion they are also included in the PDA category of personal information managers. In the following discussion, the term PDA is used in a broad sense to include traditional personal digital assistants as well as similar computing devices (including cell phones with PDA features) and associated accessories and structures.

The third category of PIM is a personal computer (PC)-based solution. In this case a desktop or laptop computer together with associated application software such as Microsoft Outlook is utilized to provide functionality similar to that described above as provided by a PDA. This functionality includes the ability to store, manipulate, and display contact information, calendar information, and the like on the PC. The PC or laptop supporting the PIM application is typically significantly larger than a PDA in terms of physical size and also employs greater CPU and memory resources. However, PC-based PIM systems also have many of the same limitations of PDA-based systems as described below. They also have other disadvantages such as increased size, price, and complexity.

Each of these categories of personal information management systems has its own distinct advantages and disadvantages, and when selecting a system to use for personal information management, consumers find there is no perfect solution. The advantages and disadvantages of each type will now be briefly summarized.

Traditional paper planners have several advantages, including comfort, simplicity, and familiarity. Using a pen to record information on a piece of paper is an input process that everyone knows. Because practically everyone has written with pen and paper since childhood, there is nothing new to learn in order to use a traditional planner. The traditional planner provides a simple, familiar, comfortable environment that imposes a minimal impediment to the flow of ideas. Traditional planners also offer flexible, personalized use. Planners tend to become very personalized documents as each user develops his or her own particular style. A user may include notes in the margins, diagrams and/or annotations in the notes area, or special symbols next to phone numbers to differentiate friends from clients. He or she may also write at angles, circle or star important items, or include receipts, newspaper clippings, or letters tucked into the pockets or between the pages of the planner. While the printed forms provide structure and guidelines for usage, users are free to customize and improvise. The planner enables a user to be creative and to personalize the tool, rather than requiring the user to adapt to the information management tool.

A traditional planner is also easy to navigate. Users are accustomed to the process of flipping through pages and intuitively understand that a larger number of pages corresponds to a larger number of days. The familiarity, flexibility, and ease of use of planners are some of the traditional advantages of these tools compared to more recent PDA and PC-based technologies.

These advantages are, however, offset by several disadvantages. First, the traditional planner typically provides no safety net to the user. Losing one's planner is nothing short of traumatic for serious users. A user rarely, if ever, keeps a "backup" of his or her planner. Accordingly, if the planner is lost or stolen, all of the phone numbers, addresses, dates, lists, plans, ideas and other information retained in the planner are irretrievably lost in most cases. This wrenching experience leaves the user with no choice but to start from scratch, reconstructing data from memory, and probably never recovering all of the information. For a user storing personal information in the planner, this can be extremely upsetting and annoying. For one storing business and career information in the planner, the loss can also have significant financial repercussions as valuable and irreplaceable contacts and plans are often lost with the planner.

A paper planner also provides only limited search capability. It provides no easy way to find a particular phrase or item of information if the user does not recall the date or some visual cue about the page the data is on. The paper planner also provides little or no automation. Recurring events must always be entered by hand, leaving open the possibility of losing or forgetting birthdays, anniversaries, or other important dates, appointments, or meetings. In addition, one can only comfortably fit a limited number of calendar pages into a planner, so accessing information from the past or from future dates (e.g., dates in the following year) is difficult if not impossible. The planner also provides no automated task management—tasks not completed on a given day must be manually carried forward to the next day. It also does not facilitate sharing of information. For example, there is no easy way to view a spouse's calendar, and no way for an administrative assistant to view or modify a user's calendar. Additionally, the paper planner provides no way to cut and paste information between the calendar and e-mail. Given that so many people regularly work with personal computers and other automated devices, having to manually track everything in a paper planner is inefficient, inconvenient, redundant, and time consuming.

With the advent of PDA- and PC- based PIMs, a number of these problems have been addressed. Users can backup data from their PDA or PC to other systems, thereby guarding against the loss of this data. PDAs and PCs also provide search functions that enable a user to find any word in any of their data as well as other automated features including automatically distributing recurring events throughout the calendar, and automatically carrying forward incomplete tasks to the next day. PDA- and PC-based calendars can also be shared, and may include alarms to remind the user of events. However, these new features are provided together with a new set of problems.

The process of entering data into the PDA is one of the main complaints of PDA users. Few users find the tactile experience of using a stylus on a plastic screen to be enjoyable. But this is a minor point compared to the inefficiency and inconvenience of having to enter text using an artificial writing system like Graffiti, or having to peck out letters on a tiny on-screen keyboard or add-on keyboard. Although various efforts have been made to improve data entry features of PDAs, users continue to find the data entry process to be complex, difficult, and generally unpleasant.

PC-based PIM systems provide a partial solution to some of these data entry problems. For example, the Tablet PC from Microsoft addresses some of these data entry problems by enabling a user to write with a stylus in his/her own handwriting on a larger screen. This improves the experience of interacting with the computer via a stylus to some extent. However, the user is still left with the unpleasant tactile experience of writing with plastic on plastic. Also, the user is required to write larger on the screen than they normally would write on a piece of paper because the lines formed on the screen are fatter (i.e., thicker) than the line left by a normal pen, and the handwriting recognition software works poorly with smaller writing. Worse still, the user must learn to navigate a complex, multi-modal "Input panel" so that the Tablet PC can discern handwriting input from cursor movements, "right clicks", and gesture commands. For these reasons, writing on a Tablet PC does not compare favorably to the easy and familiar process of writing on paper with a pen. Tablet PCs (as well as laptop computers and other types of PCs) are also usually much bigger and heavier than planners or PDAs. In fact, a general disadvantage of all tablet, laptop, or desktop PC-based solutions is that these devices are typically heavier and less portable than either PDAs or paper planners and are also typically more complex and more expensive.

PDA- and PC-based PIMs offer very little flexibility. One generally must use the PDA or PC and the accompanying software in the way in which these components were designed. There is little or no opportunity to personalize the capabilities of the PDA or PC. For example, a user cannot make notes in the margins, fold over the corners of important papers, tuck other papers between pages, or circle important items. PDA- and PC- based PIMs typically provide a rigid set of features to be used in accordance with specified procedures. Moreover, these features can be cumbersome to navigate. Instead of intuitive, tactile pages and tabs, navigation on a PDA or PC must be accomplished by clicking cryptic on-screen icons or by using various combinations of buttons.

While the advent of PDA- and PC-based PIMs resolved many of the shortcomings of the paper planner, some advantageous features were lost, and several new problems were introduced. Today the PIM market remains divided, and the question of which PIM solution is best has no definitive answer. Each of the current approaches is subject to significant problems and limitations.

One recent attempt to address some of the shortcomings of current PIMs is the Franklin Covey iScribe, which is intended to work with an optical digitizing pen from Logitech called the "Io". This product combination allows users to write on special paper using a special ballpoint pen, and transfer a digitized version of their writing back to a PC running iScribe software. The iScribe software, in turn, provides integration with Microsoft Outlook such that users can view within Outlook the information which they entered on paper in their planner. Although this design does allow users to write on paper, the iScribe product does not truly integrate digital and paper planning, but rather creates a limited one-way link from the paper domain to the digital domain. No handwriting recognition capability is provided, and even if a handwriting recognition application was used on the PC, the user has no feedback while writing about whether the handwriting recognition application on the PC will correctly interpret what they are writing. Thus, for everything the user has written, the process of reviewing the resulting recognized text is a distinct extra step which must be performed at the PC. This is inconvenient and time-consuming. Also, the planner provides no access to information that resides in the digital domain; users can merely transfer what they have written in their planners into the digital domain (e.g., into Microsoft Outlook on the PC).

The Seiko SmartPad takes yet another approach, allowing a user to insert his or her PDA into a folio which includes a paper notepad and a special pen which can digitize what is written on the pad. Information written on the pad is transferred into the PDA in graphic form such that it can be attached to events or contacts, or simply saved as individual documents. This approach allows the user to have access to digital data via the PDA interface, and to enter freehand drawing data into the PDA using pen and paper. But here again, there is only very limited integration of the paper and digital domains. The SmartPad product integrates a blank pad with a PDA, instead of integrating a fully functional paper planner with a PDA. Thus, instead of a hybrid product with the best features of PDAs and paper planners, the product offers only a rudimentary capability to use the paper to enter drawings into the PDA. With the SmartPad, there is no way to create new events or contacts working from paper. The user has only a small lined notepad on which to enter data, and there is no handwriting recognition capability provided. Also, the SmartPad device has no ability to discern one page from another. In addition, the user must write in an artificially large style in order to produce legible results on the PDA. There is also no way to control the PDA from the paper. Therefore, the user is forced to alternate between using a stylus on the PDA screen and using a pen on the paper pad.

What is needed is a tightly integrated solution that combines the best features of each of these existing solutions. The solution should allow the user to enter data in his or her own handwriting, perform handwriting recognition on the data entered, provide quick feedback on the recognition process, and allow the user to instantly make any needed clarifications or corrections. It should allow the user to enter new data, such as appointments, contacts, tasks, and notes in a familiar, simple, and intuitive way based on the already-familiar paper planner usage model, and should provide intuitive navigation through the data that is entered. The solution should also provide full access to the user's digital data, such as documents, email, and events entered via a PC or PDA instead of via the paper and digital pen. At the same time, it should enable data to be shared with others, integrated with other devices, and automatically backed up at regular intervals. The solution should also automate normally tedious and error prone processes and should provide for automated search capabilities. Ideally, the solution should, to the greatest degree possible, accommodate the working style and systems of the user and allow for personalization of the PIM system. It would also be advantageous if the solution cost less and were more rugged than a PC or Tablet PC. The present invention provides a solution for these and other needs.

SUMMARY OF INVENTION

An integrated personal information management system is described. In one embodiment, for example, an integrated personal information management system, the system of the present invention is described that comprises: a receptacle holding at least one paper page that is capable of receiving pen strokes from a digital pen; a digital pen for recording pen strokes when a user writes on a particular paper page; a page identifier for identifying the particular paper page on which the user is writing; and a handheld personal information device in communication with the digital pen and page identifier for processing the recorded pen strokes associated with the particular paper page and displaying the processing results on a display screen.

In another embodiment, for example, a method of the present invention is described for displaying information at a portable device responsive to user input on a paper page, the method comprises steps of: providing at least one paper page, each paper page capable of receiving pen strokes made using a digital pen; recording pen strokes made by a user on a paper page using the digital pen and a page identifier identifying the paper page; transferring the pen strokes and page identifier to the portable device; and generating information for display at the portable device based on processing the pen strokes and the page identifier.

In yet another embodiment, for example, a portable personal information device, the device comprising: at least one paper page, each paper page containing printed areas for receiving pen strokes when a user writes using a digital pen; a page identifier for identifying the paper page on which the user is writing; a digital pen for recording pen stroke data when a user writes on the paper page and transferring the pen stroke data to a processing module; a processing module for generating information for display based on processing the pen stroke data and the page identifier; and a display module for displaying information generated by the processing module.

BRIEF DESCRIPTION OF DRAWINGS

FIG. 5B is an illustration of an example paper calendar page illustrating the format of a planning page which can be used in conjunction with the present invention.

DETAILED DESCRIPTION

Glossary

Figure 1:
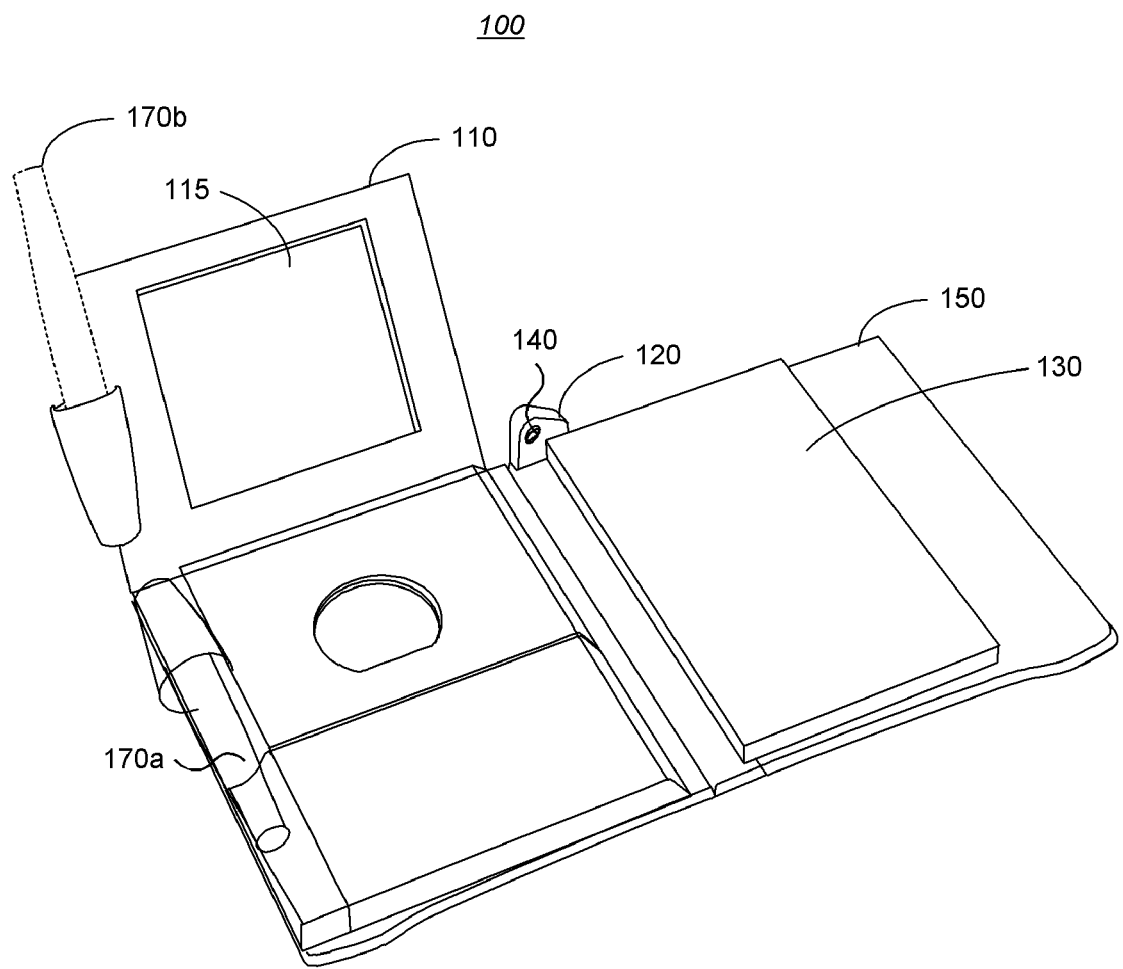
FIG. 1 is an illustration of the currently preferred embodiment of the integrated personal information management (PIM) system of the present invention.

The following definitions are offered for purposes of illustration, not limitation, in order to assist with understanding the discussion that follows.

Bluetooth: "Bluetooth" refers to a short-range radio technology aimed at simplifying communications among devices and between devices and the Internet. It also aims to simplify data synchronization between devices and other computers. Products with Bluetooth technology must be qualified and pass interoperability testing by the Bluetooth Special Interest Group prior to release. The Bluetooth 1.0 specification, the disclosure of which is hereby incorporated by reference, consists of two documents: (1) the Foundation Core, which provides design specifications, and (2) the Foundation Profile, which provides interoperability guidelines. The Bluetooth specifications are available via the Internet (e.g., currently at www.bluetooth.com).

PDA: "PDA" or "personal digital assistant" generally refers to a stand-alone handheld computing device used primarily for managing calendar, contacts, tasks, notes, and e-mail, exemplified by the Palm computer from Palm, Inc. and the Pocket PC iPAQ from Hewlett Packard. PDAs can be used to store, display, and/or manipulate various personal information including, but not limited to contact information, calendar information, and the like. Such information can be downloaded from other computer systems, can be input by way of a stylus and/or pressure sensitive screen of the PDA, or can be input using other types of input devices such as a mechanical keyboard or a voice recognition module. More recently, a new generation of cell phones include many of the features of PDAs. In this document, the term PDA is used in a broader context to include traditional personal digital assistants as well as similar computing devices (including cell phones with PDA features) and associated accessories and structures.

PIM: The term "PIM", which stands for "personal information manager", is often used to refer to hardware, software, or other tools or systems that are used to manage an individual's calendar, contact information (address/phone book), task lists, and notes. In this document, the term "personal information manager" or "PIM" is used more broadly to refer to any tool or system that an individual uses to help with management of his or her calendar, contact information, task lists, notes, and other personal and/or business information.

USB: USB stands for Universal Serial Bus, an external bus standard. The Universal Serial Bus is a bi-directional, isochronous, low cost, dynamically attachable serial interface. A single USB port can be used to connect up to 127 physical devices, such as computer mice, modems, digital cameras, scanners, and keyboards.

Introduction

Referring to the figures, exemplary embodiments of the invention will now be described. The following description will focus on the presently preferred embodiment of the present invention, which is implemented in hardware (e.g., PDA, digitizing pen, paper, and page sensor) and software (e.g., driver, application, or the like) running under an operating system, such as the Microsoft Windows CE operating system. The present invention, however, is not limited to any one particular application or any particular environment. Instead, those skilled in the art will find that the system and methods of the present invention may be advantageously embodied on a variety of different platforms, including PalmOS, Embedded Linux, Symbian, Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts.

Overview of Integrated Personal Information Management System

The present invention provides a personal information management system that combines the best aspects of a paper-based planner, a digital pen, and a PDA in a single integrated unit. In its currently preferred embodiment, the integrated personal information management (PIM) system of the present invention includes a detailed paper planner integrated with the other system components in a leather and/or plastic case.

FIG. 1 is an illustration of one embodiment of the integrated personal information management (PIM) system 100 of the present invention. As shown, components of the PIM system 100 are included in a case or folder 150. On the left side of the folder 150 is an integrated PDA 110 with a touch-sensitive (pressure-sensitive) LCD display panel 115. Also shown at the left side of the folder and connected to the PDA 110 is a digital pen 170. A single digital pen is shown in two different locations 170*a*, 170*b* at FIG. 1. In an alternative embodiment, a separate PDA or other handheld personal information device (e.g., a "smartphone" or other portable computing device) may be used in conjunction with the other system components. In this alternative, the separate PDA or handheld personal information device may be connected to the unit by clipping or snapping the device into the folder, case or other receptacle. In the presently preferred embodiment, components of the PIM system 100 are included in a case or folder; however, the user of a folder or case is not required and a different receptacle or attachment means may be utilized for attaching some or all of the components of the system, as desired. It should also be noted that is not required that the PDA or other handheld personal information device be physically attached to the folder, case, or receptacle. A number of the components of the PIM system 100 (e.g., the digital pen 170 and the PDA 110) are portable and may be detached and/or reattached from the folder, case, or receptacle from time to time and various attachment means may be used for connecting system components.

At the right side of the PIM system 100 is a binder 120 containing paper planning pages 130. The binder 120 incorporates an (optional) page sensor (optical sensor) 140 which in the presently preferred embodiment is mounted on a stem on the top of the binding as shown at FIG. 1. The page sensor 140 is positioned and aimed such that it can read a barcode printed on one of the exposed planning pages 130, and thereby determine the current page. The page sensor 140 is connected to the PDA 110, and the current page information is used by the PDA 110 to show information relevant to the current page on the LCD display panel 115. For a calendar page, this might include recurring events, tasks due, or a spouse's calendar for that same date. In an alternative embodiment the binder and/or page sensor may be omitted. Those skilled in the art will appreciate that various alternative receptacles or attachment means may be used for holding or attaching the paper pages (and other components) in lieu of a binder. In addition, if the page sensor is not included, the current page to be displayed on the display panel may be determined by other detection means. For example, a user can indicate the current page that is open in the planner by touching the page with the digital pen 170.

As the user writes on one of the planning pages 130 with a digital pen 170, everything written is digitized and transferred from the digital pen 170 to the PDA 110. Because the digital pen 170 communicates with the PDA 110, everything the user writes is recorded in digital form, but the familiar pen and paper interface is used for recording the information. The PDA 110 provides the capabilities of an independent PDA, including automation and navigation not provided by a paper planning system.

The system combines the benefits of paper-based planning and PDA-based planning in a single unit. The PDA and the paper planner together form a composite view of the user's data, which may have been written on the paper using the digital pen, or may have been synchronized to the PDA from an external source. The page sensor 140 allows the PDA 110 to track the currently open page, enabling the PDA to automatically show information relevant to that page on its LCD display panel 115. The presently preferred embodiment of the system includes a touch-sensitive (pressure-sensitive) LCD display panel 115 which allows simple, intuitive navigation of data. The system is automated, providing powerful search capabilities and enabling data to be automatically backed up at regular intervals. It supports recurring events and automatically carrying forward incomplete tasks. For example, the user can touch text they have previously written, and this action causes a search to be initiated for related notes and documents. The system can be integrated with personal computers and other devices, providing synchronization with PIM information stored on those systems. The system is flexible and allows users to personalize their PIM and develop their own style of usage.

System Components

Overview of System Components

Figure 2:
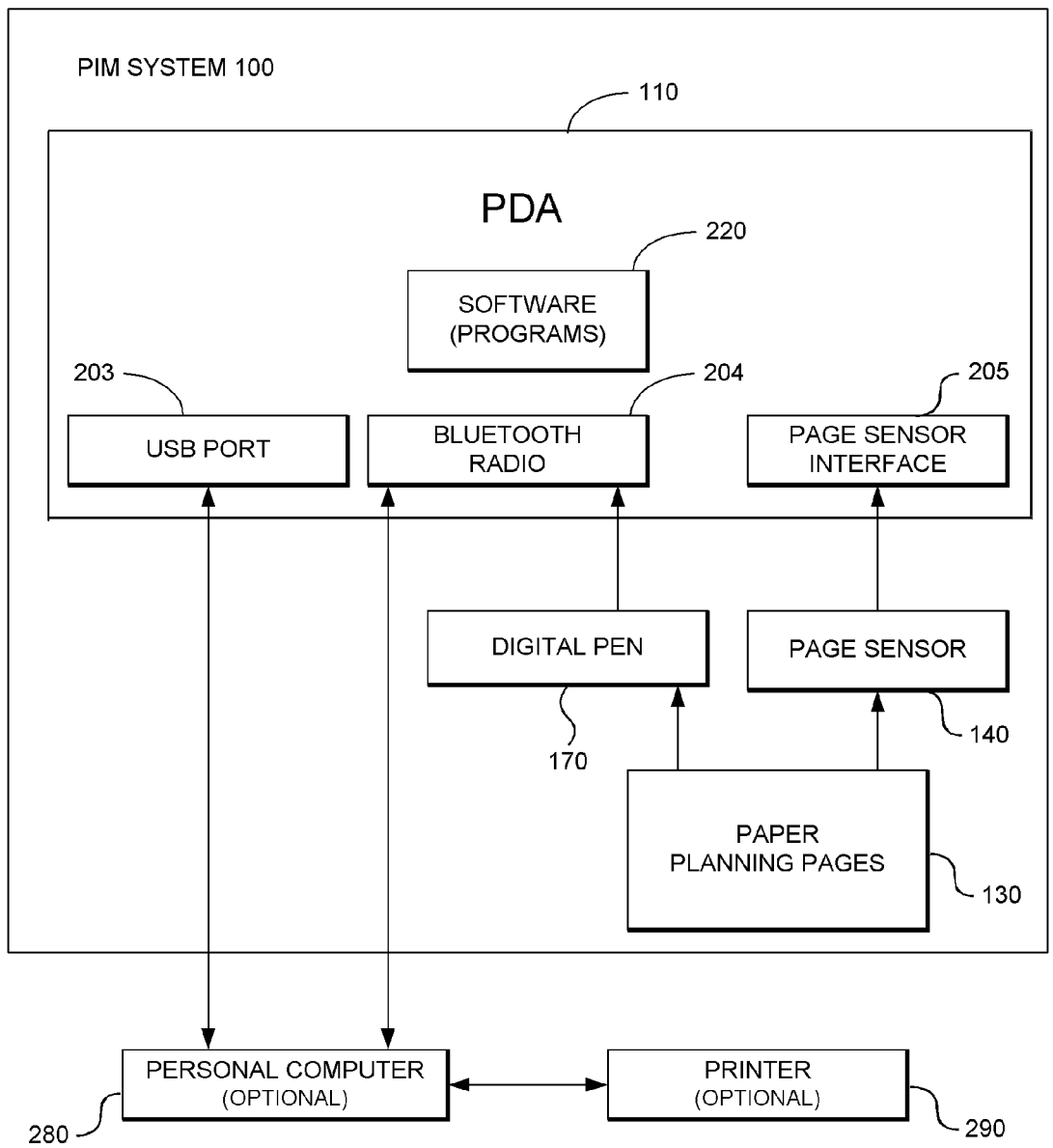
FIG. 2 is a block diagram of the components of the currently preferred embodiment of the integrated personal information manager system.

FIG. 2 is a block diagram of the components of the currently preferred embodiment of the integrated personal information manager system 100 of the present invention. As shown, the integrated PIM system 100 includes a PDA (or similar) computing system 110, a digital pen 170, a page sensor 140, and paper planning pages 130. The PDA (or PDA-like computing system) 110 includes software programs 220, a USB (Universal Serial Bus) port 203, a Bluetooth radio 204, and a page sensor interface 205. Also shown at FIG. 2 are optional devices which can be used with the system of the present invention. These include a personal computer (PC) 280 and a printer 290 connected to the PDA 110 via the USB port 203 and/or the Bluetooth radio 204. The components of the PIM system 100 and their operations are described in more detail below.

The PDA-like computing system (or simply "PDA") 110 of the currently preferred embodiment of the present invention is based on a PDA development platform such as that available from Intel Corporation as product number DBPXA255A0. Alternatively, Sophia Systems' PXA255 Sandgate Board can also be used for implementation of the PDA component of the present invention. The PDA 110 of the currently preferred embodiment includes several hardware and software components which are described in greater detail below. Those skilled in the art will appreciate that the present invention may also be implemented using various other portable devices, including PDAs, "smartphones", and other personal information devices.

The digital pen 170 of the currently preferred embodiment is an optical digitizing pen providing handwriting digitization capability. The system of the present invention leverages the recent development of digital pen technology capable of digitizing what is written in ink on a piece of paper. An example of this handwriting digitization technology is pen technology from Anoto Group AB of Sweden. More particularly, the digital pen component employed in the currently preferred embodiment is the Nokia Digital Pen SU-1B supplied by Nokia of Finland. Further description of the Nokia Digital Pen SU-1B is available from Nokia and is available via the Internet (e.g., currently at www.nokia.com/nokia/0,4879,5798,00.html). Further description of the underlying Anoto digital pen technology is available from Anoto and is available via the Internet (e.g., currently at www.anoto.com). It should be noted that although the presently preferred embodiment describes the use of a Nokia digital pen based on pen technology from Anoto, the use of this particular technology is not required for implementation of the invention. Instead, the invention may also be implemented using a number of other forms of systems for digitizing writing with a pen or other writing utensil. For example, in an alternative embodiment the handwriting digitization system may comprise a pen and a separate tracking system that monitors the motion of the pen.

In operation, as a user writes on the paper planning pages 130 using the digital pen 170, the motions of the digital pen 170 are transmitted to the PDA 110 via a wireless or wired interface, such as the Bluetooth short-range radio interface 204 illustrated at FIG. 2. It should be noted that in the event that the digital pen 170 that is employed does not support real-time transfer of data to the PDA, the user may need to first check a "send" box on the planning page to initiate the transfer of pen strokes and associated information to the PDA. As the user writes on a particular planning page, the page sensor 140 also detects the current page and makes this information available to the software programs 220 running on the PDA 110 through the page sensor interface 205. The page sensor 140 allows the PDA 110 to track the currently open page, enabling the PDA's display to be automatically updated to show information relevant to the current planning page.

The PDA 110 also provides for connectivity to other devices enabling data in the PDA to be shared and/or synchronized with other devices. As shown at FIG. 2, the PDA 110 can be connected to a personal computer (PC) 280 through either a USB interface port 203, or the Bluetooth radio 204. Information may be transferred between the PDA 110 and the PC 280 through these interfaces. The PC 280 may also have access to a printer 290. The printer 290 may be used to print new planning pages 130 which may be inserted into the PIM system 100. Alternatively, the PDA 110 may be directly connected to the printer (e.g., using USB port 203). The major components of the system of the present invention will next be described in greater detail.

PDA Component

Figure 3:
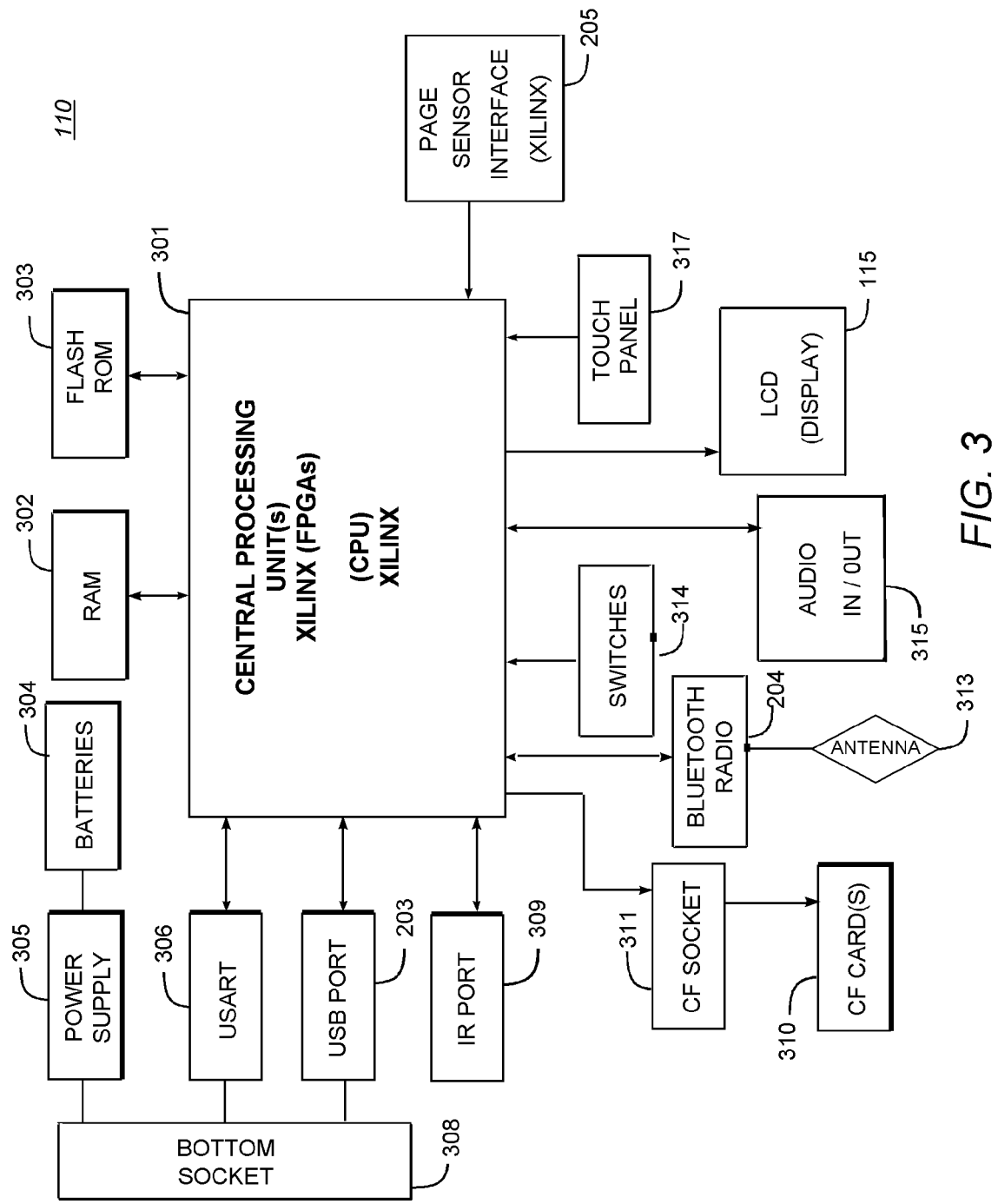
FIG. 3 is a general block diagram of the PDA component of the currently preferred embodiment.

FIG. 3 is a general block diagram of the PDA 110 component of the currently preferred embodiment. As shown, the PDA 110, comprises a central processing unit(s) (CPU) and field programmable gate arrays (FPGA) 301 coupled to random-access memory (RAM) 302, a flash read-only memory (Flash ROM) 303, a universal synchronous/asynchronous receiver transmitter (USART) 306, a USB port 203, an infrared (IR) port 309, a Bluetooth radio 204 providing external wireless connectivity through an antenna 313, input switches 314, a liquid crystal display (LCD) 115, a touch panel 317, audio input/output circuitry 315, a page sensor interface (XILINX) 205, and a Compact Flash (CF) socket 311 which can accommodate a variety of Compact Flash (CF) cards. As shown, a Compact Flash card 310 is connected to the PDA via the Compact Flash socket 311. Although not shown separately, a real time system clock is included with the PDA, in a conventional manner.

In the currently preferred embodiment of the present invention, the CPU 301 comprises a processor of the Intel Pentium family of ARM (PXA250) microprocessors. However, any other suitable high speed, low power processor may be utilized for implementing the present invention. The CPU 301 communicates with other components of the system via a bi-directional system bus (including the necessary input/output (I/O) FPGA XILINX (XCR3132) controller circuitry and other "glue" logic). The bus, which includes address lines for addressing system memory, provides data transfer between and among the various components. Description of ARM microprocessors and their instruction set, bus architecture, and control lines is available from Intel Corporation of Santa Clara, Calif.

Random-access memory (RAM) 302, serves as the working memory for the PDA. Dynamic RAM (DRAM) of sixty-four megabytes or more is employed in the currently preferred embodiment. More memory may be used without departing from the scope of the present invention. The flash read-only memory (Flash ROM) 303 contains the operating system (OS) as well as the basic input/output system code (BIOS), which is a set of low-level routines in the Flash ROM 303 that application programs and the operating system can use to interact with the hardware, to perform such tasks as reading inputs from the touch panel 317, outputting data to the LCD 115, and so forth. The flash memory (ROM) 303 can also contain application programs as well as data for long-term storage.

The PDA 110 has common input/output (10) ports consisting of a universal synchronous/asynchronous receiver transmitter (USART) 306, and a universal serial bus (USB) 203 providing external connectivity to other systems and devices through a bottom socket 308 on the bottom of the PDA unit 110. The power supply 305, is also connected through the bottom socket 308. The power supply 305 powers the unit when plugged into a power converter, as well as charges the batteries 304, including both main batteries and backup batteries (not separately shown). When the power supply 305 is not hooked up, the system runs on the batteries 304. When the main battery is too low to operate the unit properly, the system will turn off, and use the backup battery to refresh the RAM 302, so that the contents of the memory will not be lost. The switches 314 include a power switch for turning the PDA on and off. The switches 314 may also include such additional switches as may be desired for specific implementations.

In addition to the common 10 ports, the PDA 110 has an infrared port (IR) 309 for infrared communications with other devices (e.g., other personal digital assistants). The PDA also has a Compact Flash socket 311 which can interface with a variety of Compact Flash cards 310. The PDA 110 also contains a Bluetooth radio 204 and an antenna 313, used for communication with the digital pen. The Bluetooth radio 204 and antenna 313 may also be used for communication with other devices (e.g., a desktop or laptop PC).

The PDA 110 uses a liquid crystal display (LCD) 115 to display information to the user. This LCD 115 is usually backlit, with the capability of turning off the backlight for battery power saving. The LCD 115 is touch-sensitive and allows simple, intuitive navigation of data displayed on the screen. LCD screens are available from a number of vendors, including Toshiba and Fujitsu of Japan and Samsung of Korea. The currently preferred embodiment uses a 3.8" LCD Color Display model number LTM04C380K from Toshiba of Japan.

Data can be input into the PDA 110 in several different ways. The user can input data into the PDA 110 using the digital pen which is connected to the PDA through the Bluetooth radio (transceiver) 204. In addition, the user may enter data through the use of the touch panel 317. Data can also be uploaded into the PDA from other devices (e.g., from a personal computer via the USB interface 203).

In basic operation, program logic (including that which implements methodology of the present invention described below) is preloaded into Flash ROM 303 memory during the manufacturing process, for execution by the CPU 301. During operation of the program logic, the PDA accepts user input from a touch panel 317, as well as the digital pen 170 through the Bluetooth radio 204. The system permits selection of application programs, entry of keyboard-based input, and selection and manipulation of individual data objects displayed on the LCD display panel 115.

The PDA displays text and/or graphic images and other data on the display device 115. The video controller in the CPU 301 outputs to the FPGA, which in turn drives the display LCD 115. A hard copy of the displayed information, or other information within the PDA, may be obtained by outputting to a printer through the USB 203 or USART 306 ports, or through the Bluetooth radio 204.

In one embodiment, the PDA is connected via a page sensor interface 205 and a flex cable to a page sensor. The page sensor (not shown at FIG. 3) is capable of reading a bar code or other identifying mark on the current page opened in the planner. Using the page sensor connected through the page sensor interface 205, the PDA can determine which page the user has open and display information appropriate to the current planning page. It should be noted that although a page sensor is employed in the currently preferred embodiment, the current page may be determined by other means. For example, in an alternative embodiment, the user can indicate the current page that is open in the planner by touching the page with the digital pen.

Basic System Software

Figure 4:
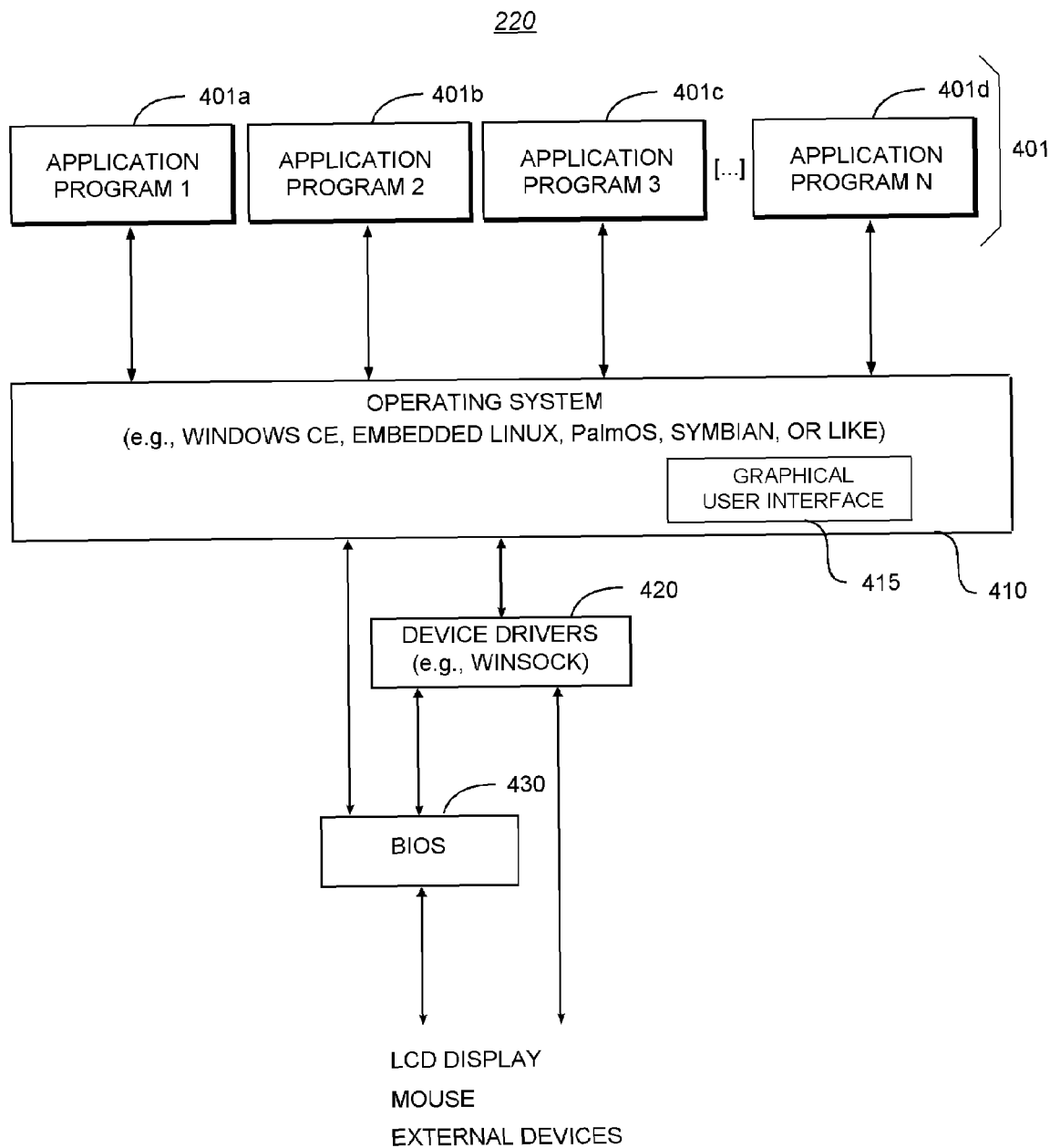
FIG. 4 is a block diagram of a software system that is provided for directing the operation of the PDA component.

FIG. 4 is a block diagram of a software system 220 that is provided for directing the operation of the PDA component 110. Software system (programs) 220, which is stored in system memory (RAM) 302 and on fixed storage (e.g., flash ROM 303 as shown at FIG. 3), includes a kernel or operating system (OS) 410. The OS 410 manages low-level aspects of computer operation, including managing execution of processes, memory allocation, file input and output (I/O), and device I/O. One or more application programs, such as client application software or "programs" 401 (e.g., 401a, 401b, 401c, 401d) may be "loaded" (i.e., transferred from fixed storage (flash ROM 303) into memory 302) for execution by the PDA 110. Certain specific applications employed in the system of the currently preferred embodiment are described below in this document.

Software system 220 includes a graphical user interface (GUI) 415, for receiving user commands and data in a graphical (e.g., "point-and-click") fashion. These inputs, in turn, may be acted upon in accordance with instructions from the operating system 410, and/or client application module(s) 401. The GUI 415 also serves to display the results of operation from the OS 410 and application(s) 401, whereupon the user may supply additional inputs or terminate the session. Typically, the OS 410 operates in conjunction with device drivers 420 (e.g., "Winsock" driver—Windows' implementation of a TCP/IP stack) and the ROM-based system BIOS 430, particularly when interfacing with peripheral devices. The OS 410 can be provided by a conventional operating system, such as Microsoft Windows CE available from Microsoft Corporation of Redmond, Wash. Alternatively, the OS 410 can also be an alternative operating system, such as Embedded Linux, PalmOS, Symbian, or the like.

Digital Pen and Paper

Figure 5A:
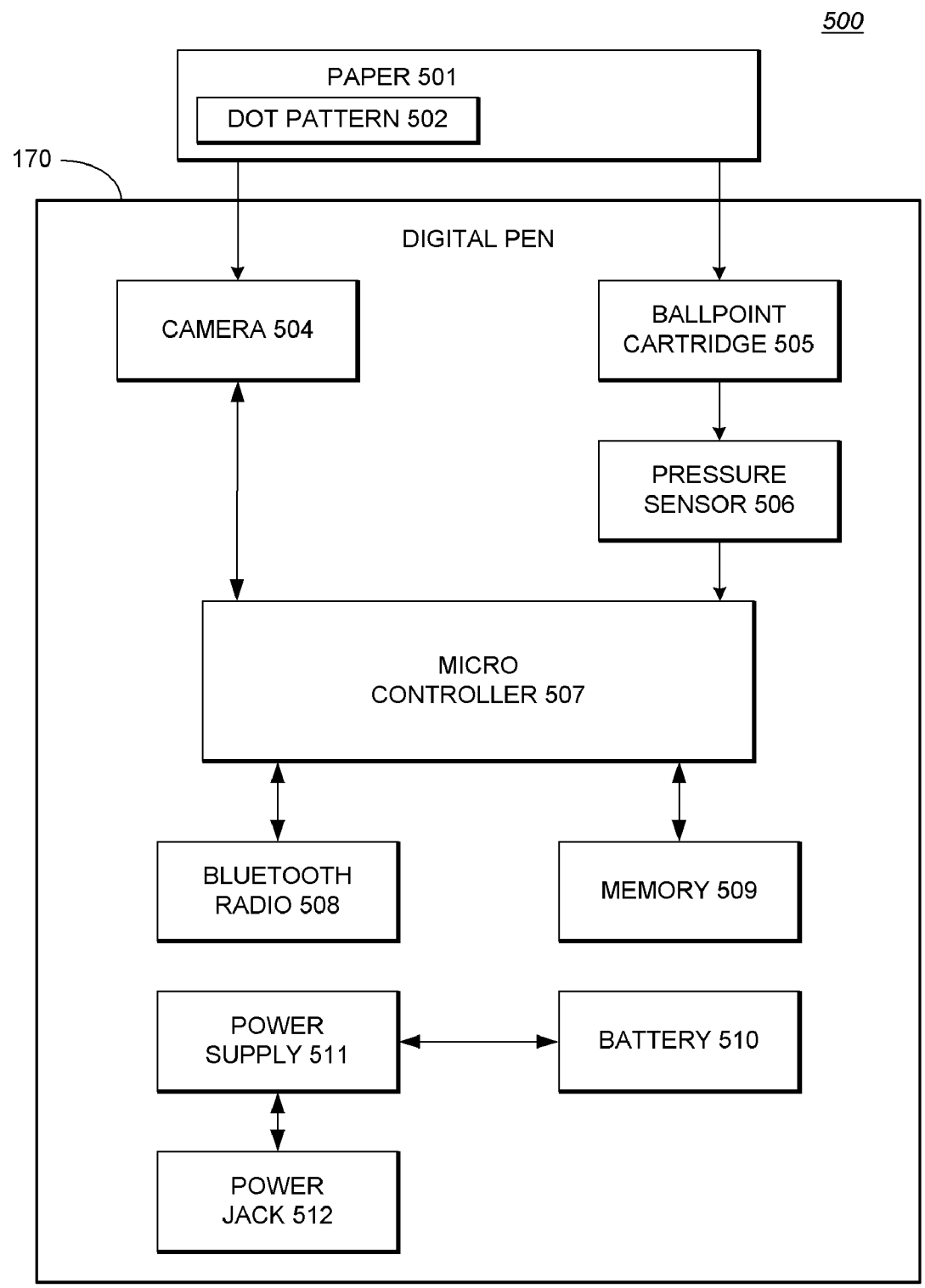
FIG. 5A is a block diagram of the components of the handwriting digitization system of the currently preferred embodiment of the system.

FIG. 5A is a block diagram of the components of the handwriting digitization system 500 of the currently preferred embodiment of the system. The handwriting digitization system 500 includes as two of its major components the paper 501 and the digital pen 170. The digital pen 170 operates like any ordinary pen using the ballpoint cartridge 505, on any paper or writing area. The ballpoint cartridge 505 is replaceable. However, the pen 170 provides handwriting digitization capability when it is used with paper 501 that is printed with a unique dot pattern 502.

In operation, when the digital pen 170 is used to write on the paper 501 (which includes the dot pattern 502), the pressure sensor 506 detects that the pen is in use and signals the micro controller 507. The micro controller 507 activates the camera 504, and searches for the unique dot pattern 502. If the dot pattern is found, the micro controller 507 begins recording the pen's writing movements ("strokes" or "pen strokes") made by the user in the memory 509. The micro controller 507 can also transmit the strokes recorded in the memory 509 through the Bluetooth radio 508 (e.g., for transmission to the PDA 110). The pen 170 is powered through a battery 510, which can be recharged through a power supply 511, when connected to its charger through the power jack 512.

In the presently preferred embodiment, the paper 501 is digitally enabled by a printed pattern of gray dots 502, with a varied spacing of approximately 0.3 mm (0.01 inch). The pattern of dots allows dynamic information coming from the digital camera in the pen to be processed into signals representing the pen strokes the user makes on the page, together with the page identification and the location on the page. The dot pattern of the paper used in the currently preferred embodiment is licensed from Anoto Group AB. Further description of the dot pattern is available from Anoto Group AB of Finland, the disclosure of which is hereby incorporated by reference. A description of the dot pattern and digital pen technology is available via the Internet (e.g., currently at www.anoto.com).

FIG. 5B is an illustration of an example paper calendar page 550 illustrating the format of a planning page which can be used in conjunction with the present invention. This example calendar page 550 is a standard paper calendar page and does not include the Anoto dot pattern described above. An example of Anoto-pen enabled planning pages which can be utilized in conjunction with the present invention are the iScribe digitally enabled planner forms from Franklin Covey.

As shown the paper calendar page 550 includes a bar code 560. As described above, the bar code 560 can be read by the page sensor to identify the current page open in the planner. The paper can also be printed with various forms which may include special icons and regions that trigger functions in the PDA when touched with the pen, such that the pen and paper can be used not only to enter new data into the PDA, but also to control PDA program functions. These printed areas of the paper (e.g., text or icons) act, in effect, like buttons or other command elements, and activate functionality in the embedded PDA when touched with the digitizing pen.

Further, the user can write information on the paper, and then later touch this written information with the pen to activate functions on the PDA specific to and determined by that written information, effectively creating dynamic handwritten command buttons or links. For example, if the user taps a calendar event where he or she has previously written the word "Cisco", the embedded PDA automatically performs a search for all documents, events, and contacts that contain the keyword "Cisco".

Page Sensor

Figure 6A:
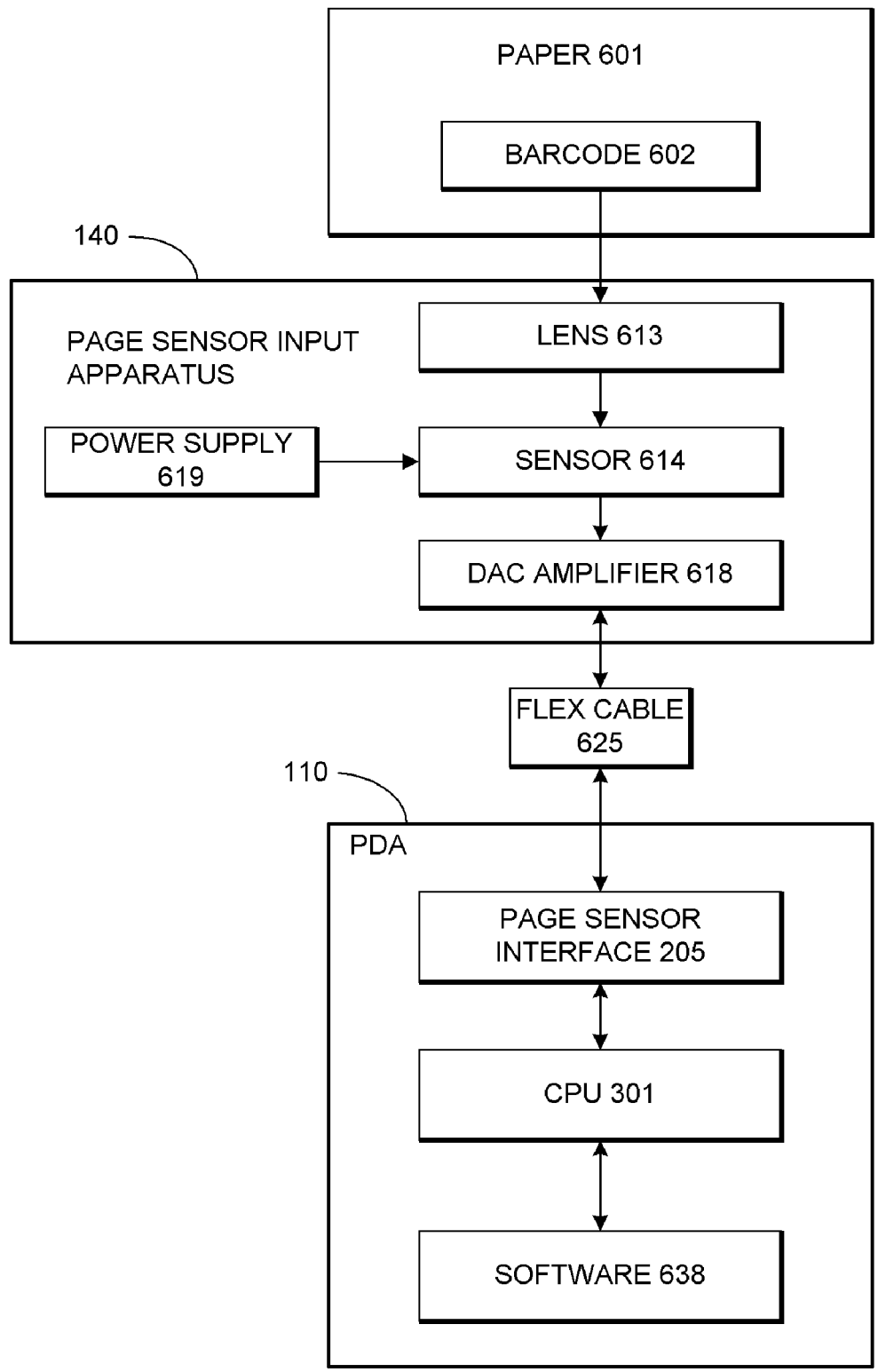
FIG. 6A is a high-level block diagram of the components used in the page sensing operations of the present invention.
Figure 6B:
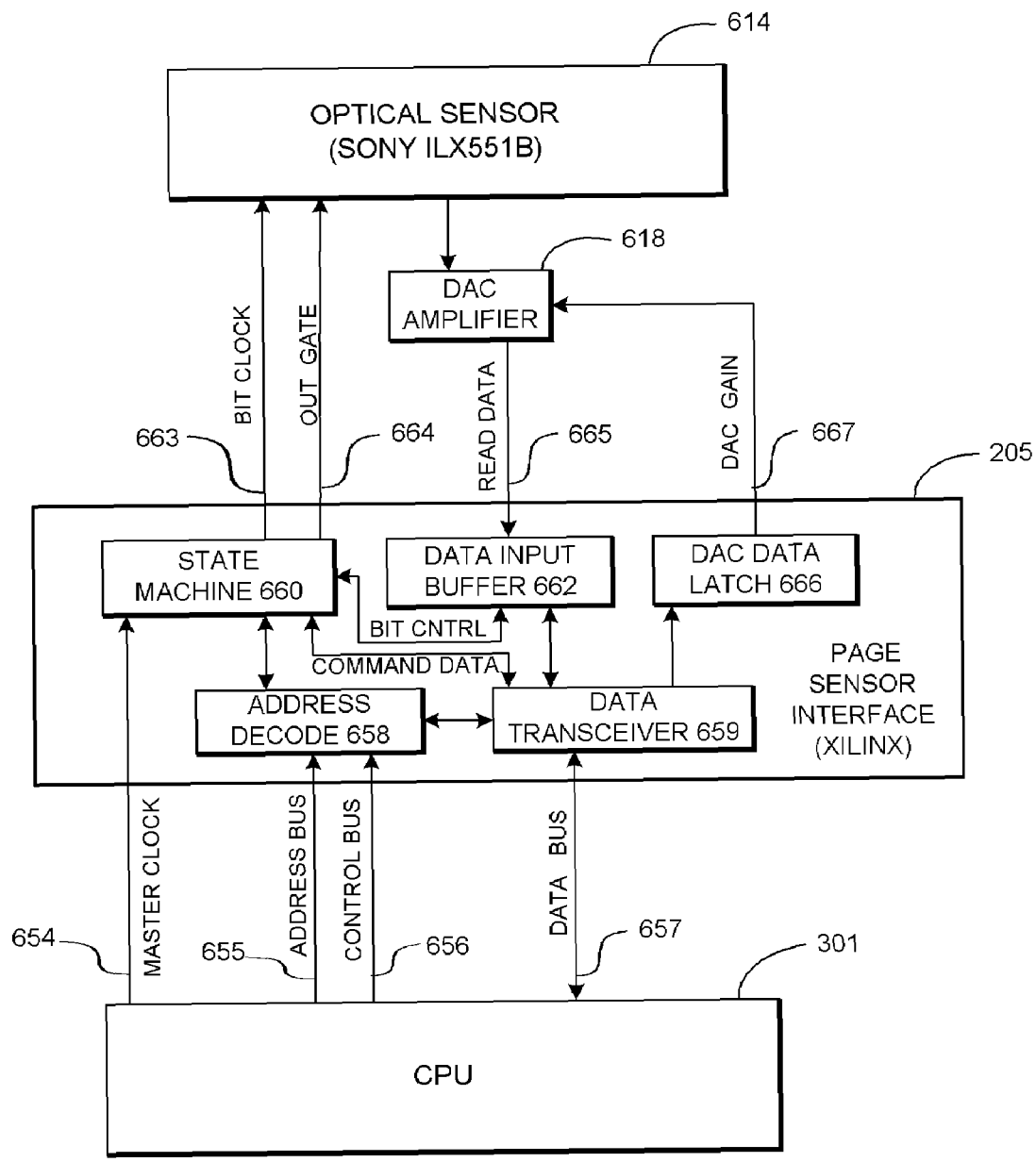
FIG. 6B is a block diagram of the page sensor interface electronics of the currently preferred embodiment.

FIGS. 6A-B are block diagrams illustrating the page sensing components and operations of the currently preferred embodiment of the present invention. FIG. 6A is a high-level block diagram of the components used in the page sensing operations of the present invention. As shown, the page sensing operations rely on the use of several different components, including a barcode (or other icon or identifier) 602 printed on a specific area on a paper page 601, a page sensor (input apparatus) 140, and the PDA 110.

The page sensor input apparatus 140 includes a lens 613, an optical sensor 614, a digital to analog (DAC) amplifier 618, and a power supply 619. In the presently preferred embodiment, the sensor 614 is an optical one-dimensional CCD light sensor. In the preferred embodiment, a Sony ILX551B CCD light sensor is employed which provides the capability of a 2048-pixel resolution, but any equivalent CCD sensor could be used. Utilizing a sensor having a 2048-pixel resolution allows for a minimum of a twelve (12) bit bar code to have over 150 pixels per bar to determine the difference between a bar coding of a one (1) or zero (0). Thus, a twelve (12) bit bar code allows for over a 4000-page capability. Alternatively, a scanning type bar code reader could be employed instead of the CCD sensor. A separate power supply 619 generates the required voltages (power) needed by the optical sensor 614. In the currently preferred embodiment, the power supply uses the PDA power supply 305 (illustrated at FIG. 3) as its power source.

In operation, the lens 613 focuses the optical sensor 614 onto an area of the paper page 601 where the barcode 602 is printed. As previously shown at FIG. 1, in the currently preferred embodiment the page sensor input apparatus 140 is mounted in a fixed location above a specific portion of the planning pages included in the PIM system 100. The lens 613 of the input apparatus is mechanically positioned so that the optical sensor 614 can view the barcode area of the paper page 601.

The input apparatus 140 is electronically connected to the PDA through the flex cable 625, and interfaces to the PDA 110 through the page sensor (XILINX FPGA) interface 205. The page sensor interface (XILINX FPGA) 205, generates timing signals as well as buffers the incoming data from the sensor 614, to the CPU 301. The CPU 301 controls the page sensor 205 through the software 638, by polling the sensor periodically to determine if the user has turned to a new page and decoding the bar code written on the page. The page sensor interface components between the input apparatus and the PDA will now be described in greater detail.

Page Sensor Interface

FIG. 6B is a block diagram of the page sensor interface electronics of the currently preferred embodiment. As shown at FIG. 6B, the page sensor interface electronics include three major components, the optical sensor 614, the page sensor (XILINX) interface 205, and the CPU 301. The optical sensor 614 (e.g., Sony CCD sensor ILX551B) connects to the page sensor interface 205. Further description of the Sony CCD sensor ILX551B is available from Sony of Japan. The page sensor interface 205, in turn, interfaces to the CPU 301.

The CPU 301 controls the XILINX chip of the page sensor interface 205, through the address bus 655, control bus 656, and data bus 657. The control bus 656 consists of chip selects, read, write, and DMA, controls. The XILINX data transceiver 659, as well as the state machine 660, and DAC data latch 666, exist in a specific memory block location set aside for the page sensor, and programmed into the address decode function 658. The CPU 301 can access the data from the data input buffer register 662 through specific addresses within the memory block. The state machine 660 can also be programmed by the CPU by outputting specific control commands.

Run function: The bit clock 663, is divided down from the master clock 654, obtained from the CPU 301. During the read operation "run", the out gate line 664, is set to high, then the bit clock 663, starts to toggle. The out gate line 664, must have a high setting prior to the rising edge of the bit clock line, and remain stable until after the last falling edge of the bit clock line. The clock sequence generally occurs 2105 times. During clock pulses 51 through 2099, the 2048 pixel data bits are acquired, by sensing the read data bit line 665, at the rising edge of the bit clock line 663. The data input buffer 662, is a 2048 bit shift register, capable of holding all 2048 data bits. The state machine 660 can be programmed to store any sequential 2048 bits, starting from bit 0 in the data stream to bit 57. This allows the machine to capture the "black" pixels as well as the valid pixels, allowing the computer to determine the noise threshold of the optical sensor 614.

Idle function: During the "idle" mode of operation the state machine 660 stops the bit clock 663 to the sensor 614, and enters a state where the CPU 301 can read the data stored in the data input buffer 662. Sixty four (64) reads of 32 bits each are required to obtain the full 2048 bits of data.

Variable light conditions: Different light conditions can be accommodated by programming the digital to analog (DAC) amplifier 618, through the parallel data control lines 667, by the DAC data latch 666. A simple multiplying DAC DAC08 is used to amplify the output data stream of the optical sensor 614.

Software Components

Figure 7:
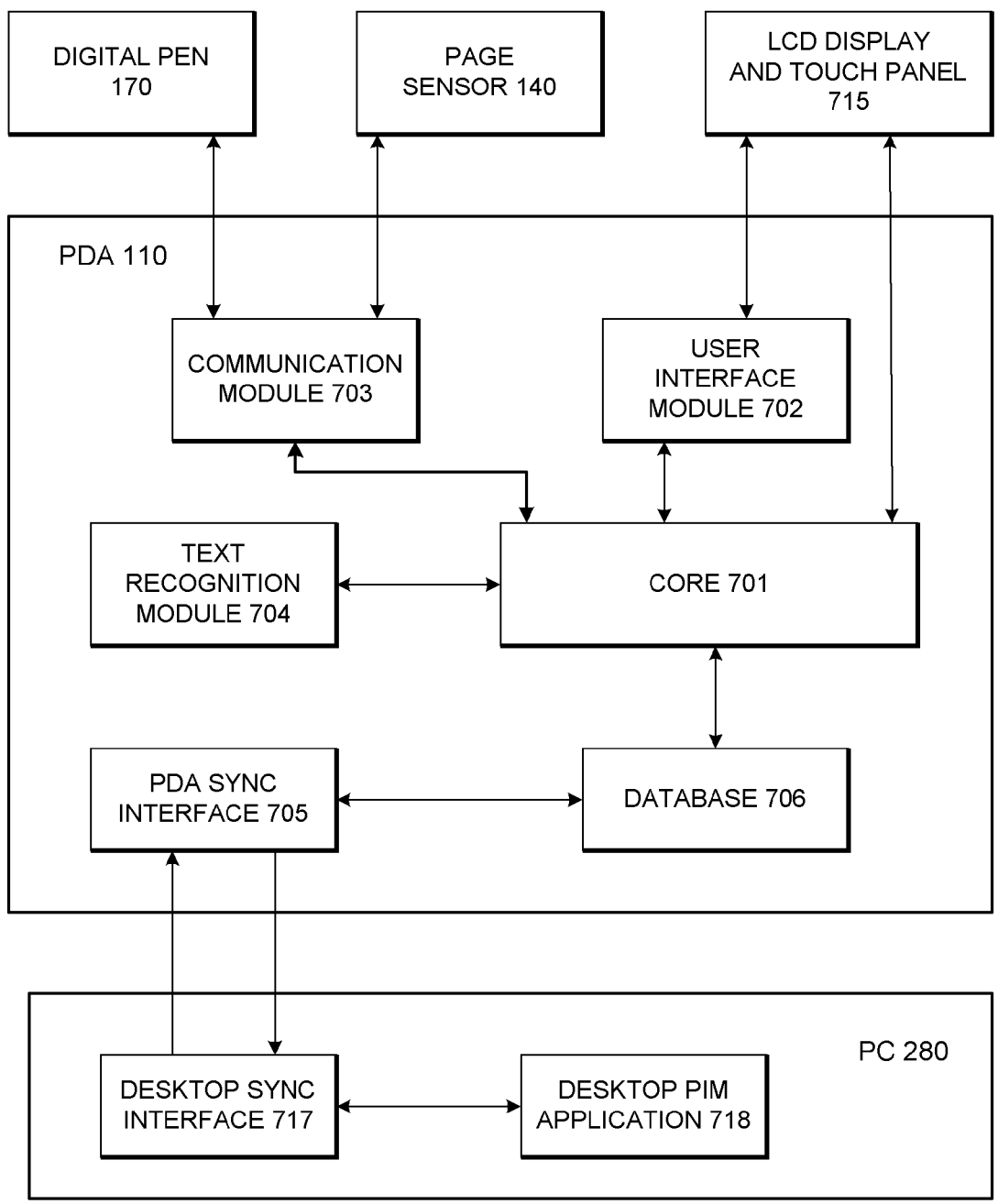
FIG. 7 is a block diagram illustrating the software components of the currently preferred embodiment of the present invention.

In addition to the above-described hardware and software components, several software components or modules are utilized in the system of the present invention. FIG. 7 is a block diagram illustrating the software components of the currently preferred embodiment of the present invention. As shown, the software components include software residing and running on the PDA 110 of the system of the present invention, as well as software which is designed to reside and run on a computer (e.g., laptop or desktop PC) that can be connected to the PDA 110 as previously described.

The software running on the PDA currently consists of six software components which together with the above-described components implement certain core functionality of the system of the present invention. As shown at FIG. 7, the software components (modules) running on the PDA include a core component 701, a user interface module 702, a communication module 703, a text recognition module 704, a PDA sync interface 705, and a database 706. These components are in addition to the operating system (not shown) running on the PDA and previously described above.

The core component 701 acts as a data flow coordinator, guiding data between the other modules. The user interface module 702 interacts with the LCD and touch panel 715 of the PDA 110 to implement the user interface. The communication module 703 implements the necessary communications code to interact with input peripherals such as the digital pen 170 and the page sensor 140.

The text recognition module 704 implements handwriting recognition algorithms which convert digitized handwriting into ASCII text. A handwriting recognition module suitable for use in conjunction with the present invention is Calligrapher SDK, available from Phatware of Mountain View, Calif. Further description of the Calligrapher SDK is available from Phatware and is available via the Internet (e.g., currently at www.phatware.com). The PDA sync interface 705 contains the code necessary to provide synchronization services between the embedded PDA and a desktop PC. In the presently preferred embodiment, the PDA sync interface 705 is provided by a Windows CE implementation of Microsoft ActiveSync. The database 706 implements a database for storing, retrieving, and searching data objects handled by the system of the present invention, which typically include calendar events, contacts, tasks, notes, expense reports, and application-specific data for user applications. In the currently preferred embodiment, the database 706 is provided by Microsoft's Windows CE-based Pocket Outlook Object Model, or "POOM".

As also shown, additional software components may be installed on a laptop, desktop, or server computer for use in conjunction with the system of the present invention. As shown at FIG. 7, a desktop sync interface 717, and a desktop PIM application 718 may be used in conjunction with the present invention. The desktop sync interface 717 implements the PC side of the synchronization services, in a fashion compatible with the PDA sync interface 705. In the preferred embodiment, the desktop sync interface 717 is provided by the Microsoft Windows version of Microsoft ActiveSync. Together, the PDA sync interface 705 and the desktop sync interface 717 implement a complete synchronization protocol and system capable of detecting changes made to the data stores (or databases) on their respective systems, and synchronizing these data stores. The desktop PIM 718 is a complete desktop PIM software package which includes a user interface and a database. In the preferred embodiment, the desktop PIM 718 is Microsoft Outlook.

System Features

General Features

The system enables a user to enter data entirely with pen on paper, the most comfortable and familiar method for most users. Because the input method is pen on paper, personalization capability is also preserved. A user can make notes in the margin, draw pictures on the page, or add a personal coding scheme. The PDA component of the system records and displays everything written by the user. A user may navigate simply by flipping through pages in the planner portion of the system. The PDA detects the current page using the page sensor, and can automatically follow the user's actions and display information appropriate to the current page.

While facilitating easy data entry and enabling a user to personalize the data that is entered, the system of the present invention also provides the advantages of a PDA. First, the impact of loss of the paper planning pages is reduced because data can be transferred to other devices (e.g., backed up frequently to a personal computer). The system also provides the automation advantages of a PDA. A user can perform a search by flipping through pages, by touching a search term and a search icon on the paper with the digitizing pen, or by entering search keywords in the display panel. The key word search provides access to all of the data in the system. In addition, recurring events do not need to be manually re-entered time and time again. A user can just turn to the appropriate page, and the display indicates the recurring events that occur on that day. Carrying forward incomplete tasks is also automatic.

The system also integrates with other devices, enabling data to be shared with others and synchronized. For example, a user may share a calendar from his or her planner in powerful new way, with a second calendar shown on the display panel for comparison. In addition, data can be saved to a personal computer and integrated with popular programs like Outlook using synchronization software such as Microsoft's ActiveSync, Palm Inc.'s HotSync, or Pumatech Inc.'s Intellisync. Conversely, new data can be entered on the PC and synchronized back to the PDA component of the system of the present invention. Any new data added this way would appear in the display panel when appropriate. An expanded data scope is also provided; the user can view information that extends beyond the physical pages present in the planner via the display panel.

Smart Forms

The system of the present invention also enables data entry on a composite medium of paper forms and an automatic, intelligent, integrated PIM-based data entry system. Forms are good for handling repeated entry processes that usually involve the same data elements or fields. However forms often quickly become complex and errorprone when there are: (1) many data elements that are rarely needed; (2) multiple decision points in the form which redirect the user (e.g., "if you entered a 1 here, go to section B; otherwise, continue to section C"); (3) multiple-choice fields with a large number of options to choose from; or (4) data dependencies between fields which must be enforced. These types of complexity-inducing entry types and decision points are referred to herein as "complex form data".

With a hybrid paper form/electronic entry system, the paper form includes only the most commonly-used fields, thereby remaining clean, simple, and focused. When there is complex form data to be gathered, these more complex portions can be handled by the PDA, keeping the paper form simple and clean. The PDA of the system of the present invention can be used to supplement and enhance the paper form in several ways. If the user enters an "invalid value" in the form, the PDA alerts the user with an audible error tone and/or error message. The definition of an "invalid value" may be determined dynamically from the values of previous entries made on the form. Also, if the user enters a value in a "decision-point" field that impacts the data to be collected next, the PDA can direct the user to the appropriate next form section and verify that he or she continues in the correct place, producing an error tone and/or message if he or she does not continue in the correct place. The PDA may also provide other feedback, such as directing the user to complete all or part of the rest of the data entry directly on the PDA screen or to enter the required data in a "soft field" on the form, which is a variable-purpose field labeled with a general identifier such as "custom 1", "custom 2", or the like. In addition, if a multiple-choice field has a large number of possible selections, these can be displayed on the PDA screen, saving space on the form. Thus, the hybrid smart form which is enabled by the integrated system of the present invention provides dynamic data validation, real-time user guidance, form simplification, and paper savings.

Automatic Association of Notes

The present invention also enables notes written by the user in the paper planner portion of the system to be automatically associated with the event corresponding to the current time. For example, a user may begin to take notes on a blank page at 12:15 pm. The PDA checks the calendar and finds that this time corresponds to the calendar event "Lunch with Mike". Subject to optional confirmation, the digitized notes are automatically stored with the event.

Composite Data View

The system of the present invention provides an electronic display which complements and operates in conjunction with a paper calendar (or a paper form of any type) in an integrated fashion. The electronic display can display items which have been synchronized from other electronic sources, and the paper and display together form a single, integrated, composite view of the user's data. The display can also supplement the paper by providing access to data that goes beyond the boundaries of the paper (e.g., the display can provide access to calendar dates beyond the date of the last physical page currently carried in the planner).

Detailed Operation

Example of Event Entry Operations

The following sequence of events illustrates the operations of the system of the present invention using an example of a user entering a new event in the integrated calendar provided by the system. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

Figure 8A:
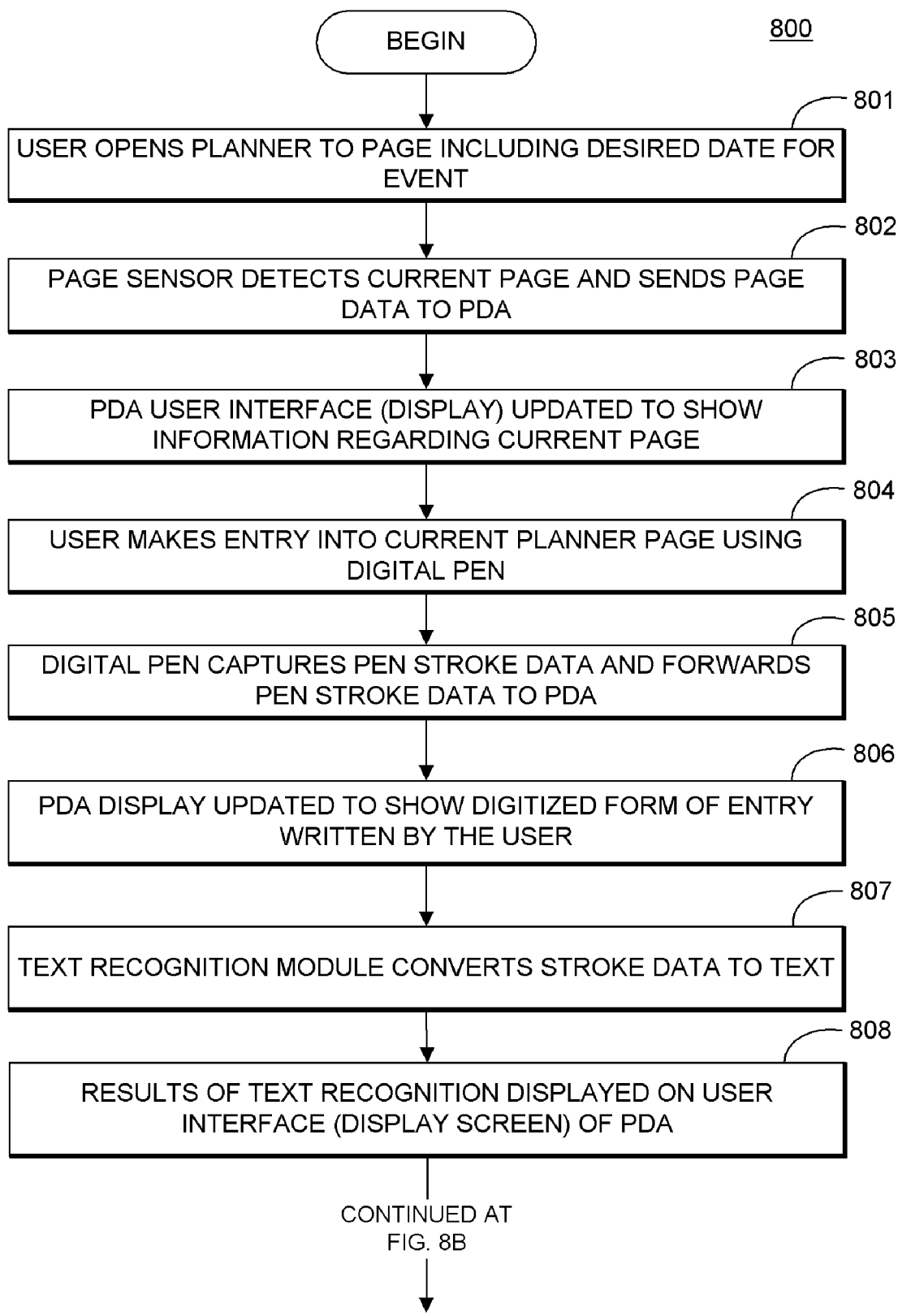
FIGS. 8A-B comprise a single flowchart illustrating a sequence of operations in adding a new event to the calendar of the system of the present invention in response to user input.
Figure 8B:
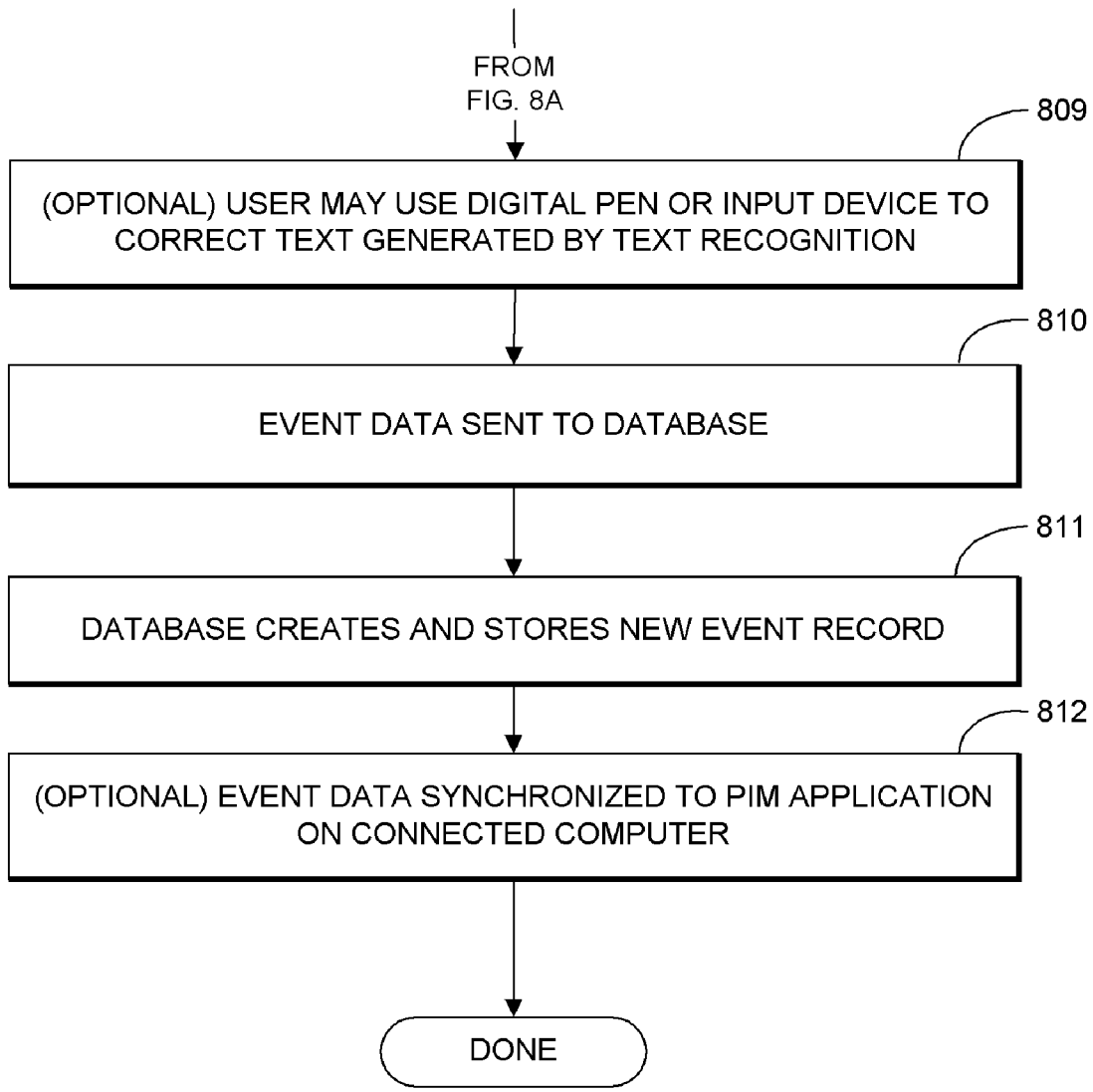

FIGS. 8A-B comprise a single flowchart 800 illustrating a sequence of operations in adding a new event to the calendar of the system of the present invention in response to user input. The process begins at step 801 with the user opening the planner pages to a particular (calendar) page that includes the desired date for scheduling the event. At step 802 the page sensor detects the current page and provides this data to the core module on the PDA via the page sensor interface and associated communication module.

At step 803 the core module invokes a user interface module to update the display (LCD of the PDA) to show data for the current page. Next, at step 804 the user may make an entry into the current page that is open in the planner. For example, the user may use the digital pen to write "lunch" in the 12:00 pm slot on a particular planner page. As the user writes the entry, at step 805 the digital pen captures the pen strokes made by the user and communicates information regarding the pen strokes to the core module on the PDA using the communication module and the Bluetooth radio communication channel.

At step 806 the core module on the PDA invokes a user interface module to update the display (LCD) to show a digitized form of what the user has written on the planner page, and sends pen stroke data as a sequence of vectors to a text recognition module. At step 807 the text recognition module converts stroke data to text (e.g., in ASCII format) and returns the result back to the core module. At step 808 the core module again invokes the user interface module to display the results of the handwriting (text) recognition processing on the display (i.e., the LCD of the PDA).

In the event the handwriting recognition results are incorrect, at (optional) step 809, the user can use the digital pen to either re-write text, or can correct the result by selecting the incorrect words, one at a time, and then selecting from a list of alternate words for each one. When the user indicates that he or she is satisfied with the text generated by the system (e.g., by selecting a confirmation box or by the expiration of a selected time period with no correction activity initiated), at step 810 the core module sends new event data to the database. This data typically includes date and time of the new event, the associated pen stroke data, and the text results of the handwriting recognition and correction process.

At step 811 the database creates and stores a new event record. The database may also (optionally) notify the PDA sync interface that data has changed. If configured to do so, at step 812 the PDA sync interface may automatically synchronize the new data to a desktop PIM (e.g., Microsoft Outlook running on a connected PC) via the desktop sync interface described above. Several of these operations will now be described in greater detail.

Receiving Notification from Pen

The following are more detailed examples of several of the operations that may be performed in the integrated personal information management system of the present invention. A first example is transferring information written by the user with the digital pen to the system's PDA component. The following "OnInitialUpdate( )" method listens for input (e.g., a file) from the system's digital pen:

```
 1:     void CFusionWareEditorView::OnInitialUpdate( )
 2:     {
 3:
 4:         // ...
 5:
 6:         // ask to be notified of a file change in the PGD target
directory, which may be a pgd file.
 7:
 8:         // IFF widcomm exists, use it's path set for incoming files,
 9:         // else default to temp dir.
10:
11:         TCHAR buf[MAX_PATH];
12:
13:         _tcscpy(buf, _T("\\Temp"));
14:
15:         LPCTSTR lpszWidcommInboxDir =
_T("SOFTWARE\\WIDCOMM\\btConfig\\Services\\0002");
16:         CRegKey cKey;
17:         LONG .lIResult = cKey.Open(HKEY_LOCAL_MACHINE,
lpszWidcommInboxDir);
18:         if (ERROR_SUCCESS = = lResult)
19:         {
20:
21:             DWORD dwCount = MAX_PATH;
22:             cKey.QueryValue(buf, _T("InboxDirectory"), &dwCount);
23:             cKey.Close( );
24:         }
25:
26:         if (_tcslen(buf))
27:         {
28:             SHCHANGENOTIFYENTRY cne;
29:             cne.dwEventMask = SHCNE_CREATE;
30:             cne.pszWatchDir = buf;
31:             cne.fRecursive = FALSE;
32:             if (!SHChangeNotifyRegister(GetSafeHwnd( ), &cne))
33:             {
34:                 this->MessageBox(_T("Failed to register for pgd change
notification!"), g_strAppName);
35:             }
36:         }
37:         // ...
38:     }
```

The PDA component of the system receives information from the digital pen component. For example, a file may be received from the digital pen via a Bluetooth "push" operation from the pen to the PDA. The above routine provides for a change notification when a new file appears in a target directory of the PDA.

The system then waits for a change notification indicating that a file has been received. When a file is received, the following "OnFileChangeInfo" routine is invoked to handle the file:

```
 1: LRESULT CFusionWareEditorView::OnFileChangeInfo(WPARAM /*
wParam */, LPARAM lParam)
 2: {
 3:     FILECHANGENOTIFY *lpfcn = (FILECHANGENOTIFY*)lParam;
 4:
 5:     FILECHANGEINFO *lpfci;
 6:     lpfci = &(lpfcn->fci);
 7:     ASSERT(lpfci->wEventId = = SHCNE_CREATE);
 8:
 9:     // this calls code to actually parse the data
10:     GetDocument( )->HandleNewPGD((LPCTSTR)lpfci->dwItem1);
11:
12:     SHChangeNotifyFree(lpfcn);
13:     return TRUE;
14: }
```

Initially, a parser is called to determine if the file that is received is a valid file in the appropriate file format (e.g., pgd format). The file format, and as a result the parser, are defined by the pen manufacturer, which is currently Anoto. If a valid file is received, the data can be parsed for use by the system.

Displaying Handwriting on Screen

The data received from the digital pen typically comprises pen stroke data representing the user's handwriting on the paper planner component of the system. The system provides functionality for displaying this handwriting on the display screen. For displaying the handwriting, the pen strokes for a given page are first processed as illustrated by the following "SetItemInfo" method:

```
 1:     void CEditItemDlg::SetItemInfo( void* pCurrentItem, CPtrArray*
pItemsArray, int iCurrentIndex )
 2:     {
 3:         for (int i = 0; i < page->m_drawAreas->GetSize( ); i++)
 4:         {
 5:             Pad DrawArea &pdArea = page->m_drawAreas->ElementAt(i);
 6:
 7:             int nSize = pdArea.m_userAreas->GetSize( );
 8:             for (int j = 0; j < nSize; j++)
 9:             {
10:                 PadArea &pArea = pdArea.m_userAreas->ElementAt(j);
11:
12:                 if (pArea.m_strokes)
13:                 {
14:                     int numStrokes = pArea.m_strokes->GetSize( );
15:                     // add each stroke - probably will change this to
just pass in the m_strokes list itself instead of
16:                     // the current one stroke at a time approach
17:                     for (int i = 0; i < numStrokes; i++)
18:                         m_graphicView.AddStroke(pArea.m_strokes->ElementAt(i)
);
19:                 }
20:             }
21:         }
22:
```

```
23:    void CBitmapDisplay::AddStroke(PenStroke &newStroke)
24:    {
25:        m_strokes.Add(newStroke);
26:        m_bRecreate = TRUE;
27:        m_bShowHorz = m_bShowVert = FALSE;
28:    }
```

As shown at line 12, a check is made to see if an area has pen strokes to be processed. If an area has pen strokes to be processed, then an "AddStroke" routine is called to add the pen strokes as provided at lines 17-19. The "AddStroke" routine itself is at lines 23-28.

The following portion of an "OnPaint" method provides for placing the pen stroke data into a memory device context for painting the pen strokes onto the display screen:

```
1:    void CBitmapDisplay::OnPaint()
2:    {
3:        CPaintDC dc(this); // device context for painting
4:
5:        if (m_bRecreate)
6:            CreateMemDC();
7:
8:        if (m_memDC)
9:            dc.BitBlt(m_nOffsetx, m_nOffsety, m_sizeClient.cx, m_sizeClient.cy, m_memDC, m_nSourcex, m_nSourcey, SRCCOPY);
10:       m_erase = FALSE;
11:   }
```

As shown above, a device context is created for painting and then at line 6 the below "CreateMemDC" method is called. After the memory device context is created (as described below), the above method simply copies the bitmap to the current device context for display as provided at line 9.

The following "CreateMemDC" method draws the pen strokes to the memory device context:

```
1:     BOOL CBitmapDisplay::CreateMemDC()
2:     {
3:
4:         if (!m_bRecreate || (!m_bmpNew.m_hObject && !m_padPage))
5:             return FALSE;
6:
7:         if (m_memDC)
8:             delete m_memDC;
9:
10:        CRect cRect;
11:        GetClientRect(cRect);
12:        m_sizeClient.cx = cRect.Width() - 18;
13:        m_sizeClient.cy = cRect.Height() - 18;
14:
15:        if (!m_padPage)
16:        {
17:            m_sizeAll.cx = (m_bmInfo.bmWidth > m_sizeClient.cx) ? m_bmInfo.bmWidth : m_sizeClient.cx;
18:            m_sizeAll.cy = (m_bmInfo.bmHeight > m_sizeClient.cy) ? m_bmInfo.bmHeight : m_sizeClient.cy;
19:
20:            m_memDC = new CDC();
21:            CClientDC dc(this);
22:
23:
24:            m_memDC->CreateCompatibleDC(&dc);
25:
26:            CDC tmpDC;
27:
28:            tmpDC.CreateCompatibleDC(&dc);
29:
30:            m_bmpOld = (HBITMAP)tmpDC.SelectObject(m_bmpNew);
31:
32:            CBitmap tmpBmp;
33:            tmpBmp.CreateCompatibleBitmap(&dc, m_bmInfo.bmWidth, m_bmInfo.bmHeight);
34:            m_memDC->SelectObject(tmpBmp);
35:
36:            m_memDC->BitBlt(0, 0, m_bmInfo.bmWidth, m_bmInfo.bmHeight, &tmpDC, 0, 0, SRCCOPY);
37:
38:            tmpDC.SelectObject(m_bmpOld);
39:        }
40:        else
41:        {
42:            // go through all the pad draw_area areas and find the min and max size . . .
43:
44:            int maxx = 0, maxy = 0;
45:
46:            int nSize = m_padPage->m_drawAreas->GetSize();
47:
48:            ASSERT(nSize);
49:            for (int i = 0; i < nSize; i++)
50:            {
51:                PadDrawArea &pArea = m_padPage->m_drawAreas->ElementAt(i);
52:                int x = pArea.m_topLeft.x + pArea.m_size.cx;
53:                int y = pArea.m_topLeft.y + pArea.m_size.cy;
54:
55:                if (maxx < x)
56:                    maxx = x;
57:                if (maxy < y)
58:                    maxy = y;
59:            }
60:
61:            // add a little extra space
62:            maxx += 5;
63:            maxy += 5;
64:
65:            m_sizeAll.cx = (maxx > m_sizeClient.cx) ? maxx : m_sizeClient.cx;
66:            m_sizeAll.cy = (maxy > m_sizeClient.cy) ? maxy : m_sizeClient.cy;
67:
68:            m_memDC = new CDC();
69:            CClientDC dc(this);
70:
71:            m_memDC->CreateCompatibleDC(&dc);
72:            m_bmpNew.CreateCompatibleBitmap(m_memDC, maxx, maxy);
73:            m_bmpNew.GetBitmap(&m_bmInfo);
74:
75:            m_bmpOld = (HBITMAP)m_memDC->SelectObject(m_bmpNew);
76:
77:            // now draw areas onto screen
78:
79:            CPen pen;
80:            pen.CreatePen(PS_SOLID, 2, RGB(0, 0, 255));
81:            HPEN oldPen = (HPEN)m_memDC->SelectObject(pen);
82:            HBRUSH oldBrush = (HBRUSH)m_memDC->SelectStockObject(WHITE_BRUSH);
83:            CRect rect(0, 0, m_sizeAll.cx, m_sizeAll.cy);
84:            rect.DeflateRect(1, 1, 1, 1);
85:            m_memDC->Rectangle(rect);
```

-continued

```
86:            m_memDC->SelectStockObject(NULL_BRUSH);
87:
88:            for (i = 0; i < nSize; i++)
89:            {
90:                PadDrawArea &pArea = m_padPage->m_draw
Areas->
ElementAt(i);
91:                m_memDC->Rectangle(pArea.m_topLeft.x,
pArea.m_topLeft.y, pArea.m_topLeft.x + pArea.m_size.cx,
pArea.m_topLeft.y + pArea.m_size.cy);
92:                if (pArea.m_userAreas)
93:                {
94:                    int uaSize = pArea.m_userAreas->GetSize( );
95:                    for (int j = 0; j < uaSize; j++)
96:                    {
97:                        PadArea &uarea = pArea.m_userAreas->
ElementAt(j);
98:                        m_memDC->
Rectangle(uarea.m_topLeft.x,
uarea.m_topLeft.y, uarea.m_topLeft.x + uarea.m_size.cx,
uarea.m_topLeft.y + uarea.m_size.cy);
99:                    }
100:
101:                }
102:            }
103:            m_memDC->SelectObject(oldPen);
104:            m_memDC->SelectObject(oldBrush);
105:        }
106:
107:        double pelsPerUnitx = (.333 * theDoc->m_pelsPer
MM_x);
108:        double pelsPerUnity = (.333 * theDoc->m_pelsPer
MM_y);
109:        int nstrokes = m_strokes.GetSize( );
110:
111:        // here is where the pen strokes are drawn to the
memory
device context
112:        CPen pen;
113:        pen.CreatePen(PS_SOLID, 2, RGB(0, 0, 255));
114:        HPEN oldPen =
(HPEN)m_memDC->SelectObject(pen);
115:        const double offset = PAGEOFFSET / 2.;
116:        for (int i = 0; i < nstrokes; i++)
117:        {
118:            PenStroke &stroke = m_strokes.ElementAt(i);
119:            int numPoints = stroke.numPoints;
120:            POINT m_line[2]; // Point array for drawing
121:
122:
123:            double x = (((double)stroke.points[0].x) /
CALLIG_FIXUP +
offset) * pelsPerUnitx;
124:            double y = (((double)stroke.points[0].y) /
CALLIG_FIXUP +
offset) * pelsPerUnitx;
125:
126:            m_line[0].x = (int)x;
127:            m_line[0].y = (int)y;
128:
129:            for (int j = 0; j < numPoints; j ++ )
130:            {
131:
132:                x = ((((double)stroke.points;[j].x) /
CALLIG_FIXUP) +
offset) * pelsPerUnitx;
133:                y = ((((double)stroke.points[j].y) /
CALLIG_FIXUP) +
offset) * pelsPerUnitx;
134:
135:                m_line[1].x = (int)x;
136:                m_line[1].y = (int)y;
137:
138:                if ( HWRAbs(m_line[0].x − m_line[1].x) +
HWRAbs(m_line[0].y − m_line[1].y) >= 2)
139:                {
140:
141:                    m_memDC->Polyline(m_line, 2 );
142:                    m_line[0] = m_line[1];
143:                }
144:            }
145:        }
146:
147:        m_memDC->SelectObject(oldPen);
148:
149:        // . . . then it goes on to set up scroll bars . . .
150:
151:        return !(m_bRecreate = FALSE);
152: }
```

As provided above, areas (rectangles) of the appropriate size and at the appropriate location for containing the pen strokes are first drawn. The pen strokes are actually drawn to the memory device context as illustrated at lines 112-145. After all of the pen strokes are drawn, the memory context device is copied for display on the screen as provided above.

Sending Data to Text Recognition Engine

The system of the present invention includes functionality for converting a user's handwritten input into text that may be displayed, stored, searched, and otherwise manipulated in the system. The following "ProcessPages" routine receives and processes data from the system's digital pen:

```
1:    Ret_t ProcessPages(InstanceID_t id, VoidPtr_t pUserData,
PagesPtr_t
pContent)
2:    {
3:        TRACE0("Enter ProcessPages . . . \r\n");
4:
5:        // create test padfile info
6:        CFusionWareEditorDoc *pDoc = (CFusionWareEditorD
oc*)pUserData;
7:        CStrokesDB &sDB = pDoc->GetStrokesDatabase( );
8:        CProgressCtrl &progCtrl = theMainView->m_progressCtrl;
9:        theMainView->m_progText.SetWindowText(_T("Proces-
sing new pen
data . . . "));
10:       progCtrl.ShowWindow(SW_SHOW);
11:       Idle( );
12:       pDoc->m_szTestData = _T(" ");
13:
14:       // First get the pen data as pages from the WBXML
parser
15:       CString strText;
16:       // Now parse the STF Data along with Stylo data
17:       PageListPtr_t pagelist = NULL;
18:       PagePtr_t page = NULL;
19:       pagelist = pContent->pages;
20:       StfDecoder1_0 stfdecoder;
21:       float offsetX = 0, offsetY = 0;
22:       int iPages = 0;
23:       while(pagelist)
24:       {
25:           // get next in the list
26:           pagelist = pagelist->next;
27:           iPages++;
28:       }
29:
30:       CPage* pcPage = new CPage[iPages];
31:       pagelist = pContent->pages;
32:       iPages = 0;
33:       while(pagelist)
34:       {
35:           // get each page stuff
36:           page = pagelist->item;
37:           if( page )
38:           {
39:               STFPtr_t stf = NULL;
40:               StyloPtr_t stylo = NULL;
41:               stf = page->stf;
42:               stylo = page->stylo;
```

-continued

```
43:            PcdataPtr_t stylodata = NULL;
44:            PcdataPtr_t stfdata = NULL;
45:            if( stylo )
46:            {
47:                stylodata = stylo->table->data;
48:            }
49:            if(stf)
50:            {
51:                stfdata = stf->data;
52:            }
53:            pcPage[iPages].SetSize( CSize(page->width, page->height) );
54:
55:            if(page->pa)
56:            {
57:                // To Do make char* to TCHAR*
58:                wchar_t* lpwszID = NULL;
59:                int iLength = 0;
60:                char* pszID = smlPcdata2String(page->pa);
61:                LocaleStringToUnicode( pszID, &lpwszID, &iLength);
62:                pcPage[iPages].Id(lpwszID);
63:                delete [ ] lpwszID;
64:            }
65:            else
66:            {
67:                pcPage[iPages].Id(_T("0.0.0.0"));
68:            }
69:
70:            BinaryReader reader = BinaryReader((BYTE*)stfdata->content, stfdata->length );
71:            stfdecoder.decode( reader, stylodata ? (BYTE*)stylodata->content: NULL, stylodata ? stylodata->length : 0, pcPage[iPages], offsetX, offsetY );
72:            iPages++;
73:        }
74:
75:        // get next in the list
76:        pagelist = pagelist->next;
77:    }
78:    if (g_padInfo == NULL)
79:        g_padInfo = new CPadInfo;
80:
81:    // Now iterate through the pages and pull out the items
82:    for (int pageIndex = 0; pageIndex < iPages; pageIndex++)
83:    {
84:        if (g_padInfo->SelectPage(pcPage[pageIndex].Id( )))
85:        {
86:            // page already exists . . .
87:            g_padInfo->ResetCurPageData( );
88:        }
89:        else
90:        {
91:            if (!g_padInfo->LoadPadFile((LPCTSTR)g_padFileName, pcPage[pageIndex].Id( )))
92:                continue; // try next page
93:            g_padInfo->SelectPage(pcPage[pageIndex].Id( ));
94:        }
95:        CString strFormat;
96:        CString strData;
97:        CStroke* pStroke = NULL;
98:        vector<CStroke>& strokes = pcPage[pageIndex].GetStrokes( );
99:        UINT numStrokes = strokes.size( );
100:        double tLastTime = 0.;
101:        g_padInfo->SetCurPageCreateTime(strokes[0].StartSecond( ));
102:        progCtrl.SetRange(0, numStrokes * 2 + g_padInfo->m_pages.GetSize( ) + 2);
103:        progCtrl.SetStep(1);
104:
105:        // setup calligrapher
106:        PenStrokes pAllStrokes = new PenStroke[numStrokes];
107:        pDoc->m_callig->CleanStorage( );
108:
109:        // start new section
110:        TRACE0("StartSect called . . . \r\n");
111:        pDoc->m_callig->StartSect( );
112:        UINTwordsFound;              // number of words found
113:        // store off first time
114:
115:        // Main loop for converting Anoto floating point strokes to
116:        // integer values and storing them and other relevant data
117:        // in the DB
118:        if (numStrokes)
119:            tLastTime = strokes[0].Time( );
120: #ifdef _DEBUG
121:        short minX, minY, maxX, maxY;
122:        minX = minY = SHRT_MAX;
123:        maxX = maxY = 0;
124: #endif
125:        for( UINT i = 0; i < numStrokes; i++)
126:        {
127:            pStroke = &strokes[i];
128:            vector<FPOINT>& samples = pStroke->Samples( );
129:            CPoint *cPoints = new CPoint[samples.size( )];
130:            pDoc->m_callig->StartStroke( );
131:            UINT numSamples = samples.size( );
132:            double tTime = pStroke->Time( );
133:
134:            // if time difference between strokes is greater than
135:            // 1200 ms start new section.
136:            if ((tTime – tLastTime) > 1200)
137:            {
138:                TRACE0("closing callig section due to time difference\r\n");
139:                pDoc->m_callig->EndSect( );
140:                TRACE0("EndSect called . . . \r\n");
141:                // start another since we have another stroke at least
142:                pDoc->m_callig->StartSect( );
143:                TRACE0("StartSect called . . . \r\n");
144:            }
145:            tLastTime = tTime + pStroke->Duration( );
146:            TRACE1("Adding %d points\r\n", numSamples);
147:
148:            // the Anoto points come in as floating point values, which must be translated to integer for the recognizer
149:            for (UINT j = 0; j < numSamples; j++)
150:            {
151:                // convert from float to integer
152:                AnotoPointToCPoint(samples[j], cPoints[j], pDoc);
153:                // add to recognizer
154: #ifdef _DEBUG
155:                // find the bounds for debug purposes
156:                int x, y;
157:                x = cPoints[j].x;
158:                y = cPoints[j].y;
159:                if(x < minX)
160:                    minX = x;
161:                else if (x > maxX)
162:                    maxX = x;
163:                if (y < minY)
164:                    minY = y;
165:                else if (y > maxY)
166:                    maxY = y;
167: #endif
168:            }
169:
170:            // save points in temp array
171:            pAllStrokes[i].points = cPoints;
172:            pAllStrokes[i].numPoints = numSamples;
173:            progCtrl.StepIt( );
174:            Idle( );
175:            // now find section for this item
176:            pDoc->m_callig->EndStroke( );
177:        }
```

```
178:            pDoc->m_callig->EndSect( );
179:            TRACE0("EndSect called . . .\r\n");
180:
181:            // The points have been converted, now send them
182:            // to the recognizer, and fill the RecogData structure,
183:            // Each RecogData structure will contain the strokes,
words and alternate words found
184:            // and each is associated with a Page location
or PadArea
185:            CMap<PadArea*, PadArea*&, PadArea*, PadArea*&>
padMap;
186:            PadArea *lastArea = NULL;
187:
188:            // divide strokes up into areas as defined by PAD
file
189:            for (i = 0; i < numStrokes; i++)
190:            {
191:                // see below for implementation of FindPad
Area
192:                PadArea *area =
g_padInfo->FindPadArea(pAllStrokes[i].points,
pAllStrokes[i].numPoints);
193:                if(!area)
194:                {
195:                    TRACE0("Received stroke that was not
associated
with any page location!");
196:                    if (lastArea)
197:                        lastArea->m_strokes->Add(pAllStrokes
[i]);
198:                    continue;
199:                }
200:                TRACE1("Stroke added to area %s\r\n",
(LPCTSTR)area->m_name);
201:
202:                // keep pad areas in a map for easy look each
iteration through this loop
203:                if (!padMap.Lookup(area, area))
204:                {
205:                    padMap[area]= area;
206: #ifdef ZFORTIFY
207: #undef new
208: #endif
209:                    area->m_strokes = new Carray<PenStroke,
PenStroke&>;
210: #ifdef ZFORTIFY
211: #define new ZFortify_New
212: #endif
213:                }
214:                ASSERT(area->m_strokes);
215:                area->m_strokes->Add(pAllStrokes[i]);
216:                lastArea = area;
217:                progCtrl.StepIt( );
218:                Idle( );
219:            }
220:
221:            // now send each area's strokes to recog engine
222:            POSITION pos = padMap.GetStartPosition( );
223:            Calligrapher *pCallig = pDoc->m_callig;
224:            while (pos != NULL)
225:            {
226:                PadArea *area, *area1;
227:                padMap.GetNextAssoc(pos, area, area1);
228:                ASSERT(area == area1);
229:                CArray<PenStroke, PenStroke&> *strokes =
area->m_strokes;
230:                int nStrokes = strokes->GetSize( );
231: #ifdef ZFORTIFY
232: #undef new
233: #endif
234:                if(!area->m_wordData)
235:                    area->m_wordData = new CArray<Recog
WordData,
RecogWordData&>;
236: #ifdef ZFORTIFY
237: #define new ZFortify_New
238: #endif
239:
240:                if (nStrokes)
241:                {
242:                    // recognition engine called here for each
page/PAD section
243:                    pCallig->OpenDefaultSession( );
244:                    for (i = 0; i < (UINT)nStrokes; i++)
245:                    {
246:                        PenStroke &stroke = (*strokes)[i];
247:                        pCallig->Recognize(stroke.numPoints,
stroke.points); // And send it to recognition
248:                    }
249:                    pCallig->Recognize(0, NULL); // end section
250:                    pCallig->CloseSession( );
251:                    p_RecogWordData recogData = NULL;
// array of
recognized words
252:                    if (DoRecognize(pDoc->m_callig,
&recogData,
wordsFound, pDoc))
253:                    {
254:                        TRACE1("DoRecog found %d words\r\n",
wordsFound);
255:                        FillRecogWordData(recogData,
wordsFound,
strokes, pDoc);
256:                        for (UINT k = 0; k < wordsFound; k++)
257:                        {
258:                            //          recogData[k].id =
pDoc->GenerateUID( );
259:                            recogData[k].pageID = 1;
260:                            //
recogData[k].StoreData(sDB);
261:                            recogData[k].padArea = area;
262:                            recogData[k].bDeleteData = FALSE;
263:                            area->m_wordData->
Add(recogData[k]);
264:                        }
265:                        delete[ ] recogData;
266:                    }
267:                }
268:                progCtrl.StepIt( );
269:            }
270:            delete[ ] pAllStrokes;
271:
272:            // g_padInfo now has all the words
273:            TRACE2("minX = %d, minY = %d\r\n", minX, minY);
274:            TRACE2("maxX = %d, maxY = %d\r\n", maxX,
maxY);
275:        } // for (pageIndex = . . .
276:
277:        pDoc->UpdateAllViews(NULL);
278:        sDB.Close( );
279:        TRACE0(" . . . Exit ProcessPages\r\n");
280:        progCtrl.ShowWindow(SW_HIDE);
281:        theMainView->m_progText.SetWindowText(_T("Wait-
ing for new pen
data . . . "));
282:        return SML_ERR_OK;
283:    }
```

Initially, the pen data is received by the above "ProcessPages" routine as pages from a WBXML parser. Commencing above at line 82, the routine iterates through the pages to process the pen stroke data. The main loop for converting the pen stroke data commences at line 118. In the presently preferred embodiment of the system, the pen stroke data comprises floating point values which are converted to integer values for use by the text recognition module.

After the conversion of the floating point values to integer values, the pen stroke data is associated with particular areas defined by a "PAD" file as provided above at lines 189-219. In particular at line 192, a call is made to the "FindPadArea" method described below to determine the area in which a given pen stroke was made. After strokes are associated with particular areas, each area's strokes are sent to a text recognition module (or engine) as provided at lines 222-270. The text recognition engine fills in a "RecogData" structure. Each "RecogData" structure contains the strokes, words, and alternate words found by the text recognition engine and associates each with a page location or "PadArea". As part of this process the below "DoRecognize" routine is called as provided above at line 252.

The below "DoRecognize" routine obtains information from the text recognition engine about the words that are recognized:

```
 1:    BOOL DoRecognize(Calligrapher *m_callig, p_RecogWor
dData* data,
UINT &num_ans, CFusionWareEditorDoc *pDoc )
 2:    {
 3:         TRACE0("DoRecognize called\r\n");
 4:
 5:         if (!m_callig->IsLoaded( ))
 6:              return FALSE;
 7:         UINT num_alts, num_strokes, weight;
 8:         TCHAR * ptr;
 9:         TCHAR str[256];
10:    #ifdef _DEBUG
11:         CString strRecognized = _T("");
12:    #endif
13:
14:         // get the number of words found/recognized
15:         num_ans = m_callig->GetAnswers( CGA_NUM_ANS
WERS, 0, 0 );
16:         if (num_ans = = 0)
17:              return FALSE;
18:
19:         (*data) = new RecogWordData[num_ans];
20:
21:         TRACE1("Answers found: %d\r\n", num_ans);
22:
23:         for (UINT k = 0; k < num_ans; k++ )
24:         {
25:              // get number of alternates
26:              num_alts = m_callig->GetAnswers(CGA_NUM_
ALTS, k, 0);
27:              (*data)[k].numAlts = num_alts;
28:              // allocate space to store alternatives
29:              (*data)[k].alts = new LPTSTR[num_alts];
30:              // allocate place to store weights (percent proba
bility)
for each alternate
31:              (*data)[k].weights = new DWORD[num_alts];
32:
33:              // get number of strokes used
34:              num_strokes = m_callig->GetAnswers(CGA_ALT_
NSTR, k, 0);
35:              (*data)[k].numStrokes = num_strokes;
36:
37:              // get the actual strokes used (may or may not m
atch those
sent in
38:
39:              (*data)[k].strokesUsed = (int
*)m_callig->GetAnswers(CGA_ALT_STROKES, k, 0);
40:
41:              UINT highWeight = 0;
42:
43:              // now ask for each alternative: the first one is t
he one
44:              // we default to using
45:              for (UINT i = 0, n = 0; i < num_alts; i++ )
46:              {
47:                   // get the alternate
48:                   ptr = (TCHAR *)(m_callig->GetAnswers(CGA_A
LT_WORD, k,
i)); // Get word alternative
49:                   int len = _tcslen(ptr) * sizeof(TCHAR);
50:                   (*data)[k].alts[i] = new TCHAR[len];
51:                   _tcscpy((*data)[k].alts[i], ptr);
52:
53:                   // get this alternates percent probability
54:                   weight = (int)m_callig->GetAnswers(CGA_ALT
_WEIGHT, k,
i); // Get weight of the alternative
55:                   (*data)[k].weights[i] = weight;
56:                   if (weight > highWeight)
57:                   {
58:                        highWeight = weight;
59:                        (*data)[k].selIndex = i;
60:                   }
61:
62:
63:                   // DEBUG ONLY: Place answers in the ans buff
er
64:    #ifdef _DEBUG
65:                   strRecognized += ptr;
66:                   strRecognized += _T(" : ");
67:                   wsprintf(str, _T("%d"), weight);
68:                   strRecognized += str;
69:                   strRecognized += ", ";
70:    #endif
71:              }
72:    #ifdef _DEBUG
73:              strRecognized += _T("\r\n>>>");
74:              wsprintf(str, TEXT("Nstrokes: %2d"), num_strokes
);
75:              strRecognized += _T("\r\n>>>");
76:              strRecognized += str;
77:              strRecognized += _T("\r\n>>>");
78:    #endif
79:         }
80:
81:    #ifdef _DEBUG
82:         // TRACE will crash is StrRecognized is too long.
83:         CString traceOut;
84:         if (strRecognized.GetLength( ) > 20)
85:              traceOut = strRecognized.Left(20);
86:         else
87:              traceOut = strRecognized;
88:         TRACE1("%s\r\n", traceOut);
89:         pDoc->m_szTestData += strRecognized;
90:    #endif
91:
92:         return TRUE;
93:    }
```

The above "DoRecognize" routine is called after all strokes for a given session have been sent to the system's text recognition engine. The above routine asks the recognition engine to provide the words, alternative words, weights (i.e., probabilities), and actual strokes used for each word recognized by the recognition engine.

The following are the routines that determine the location of a given pen stroke. These routines determine which page or PAD area a given pen stroke is to be associated with by identifying the location (i.e., bounds) of the stroke and which page or PAD area rectangle contains the majority of the stroke bounds. There are various ways to optimize these operations, but the current implementation is straightforward. Another result of the following routines are that the type of item (or object) that the pen strokes create (e.g., an event, task, note, e-mail, contact, etc.) can also be determined by consulting page definition files.

The following "NumRectPointsInRect" function first determines if an area has any of the bounding vertices:

```
1:    int NumRectPointsInRect(CRect &checkRect, CRect &test
Rect)
2:    {
3:         int count = 0;
4:         if (checkRect.PtInRect(testRect.TopLeft( )))
5:              count++;
```

```
        6:         if (checkRect.PtInRect(testRect.BottomRight( )))
        7:             count++;
        8:         CPoint ptTopRight(testRect.right, testRect.top);
        9:         if (checkRect.PtInRect(ptTopRight))
       10:             count++;
       11:         CPoint ptBottomLeft(testRect.left, testRect.bottom);
       12:         if (checkRect.PtInRect(ptBottomLeft))
       13:             count++;
       14:
       15:         return count;
       16:     }
```

The above function determines if an area has any of the bounding vertices and returns the number of vertices in the area, if any.

The following "FindPadArea" function obtains the bounds of the stroke and iterates over the PAD areas to see which area, if any, contains most of the stroke bounds:

```
 1:   PadArea *CPadInfo::FindPadArea(CPoint *stroke, UINT numPoints)
 2:   {
 3:       ASSERT(numPoints);
 4:
 5:       // get the bounds of the stroke
 6:       CRect bounds(stroke[0].x, stroke[0].y, stroke[0].x, stroke[0].y);
 7:
 8:       long &xMin = bounds.left;
 9:       long &yMin = bounds.top;
10:       long &xMax = bounds.right;
11:       long &yMax = bounds.bottom;
12:
13:       for (UINT i = 1; i < numPoints; i++)
14:       {
15:           if (xMin > stroke[i].x)
16:               xMin = stroke[i].x;
17:           else if (xMax < stroke[i].x)
18:               xMax = stroke[i].x;
19:
20:           if (yMin > stroke[i].y)
21:               yMin = stroke[i].y;
22:           else if (yMax < stroke[i].y)
23:               yMax = stroke[i].y;
24:       }
25:
26:       double pelsPerUnitx = (.333 * theDoc->m_pelsPerMM_x);
27:
28:       // now adjust to PAD points
29:       xMin = PAD_ADJUST(xMin)*pelsPerUnitx;
30:       yMin = PAD_ADJUST(yMin)*pelsPerUnitx;
31:       xMax = PAD_ADJUST(xMax)*pelsPerUnitx;
32:       yMax = PAD_ADJUST(yMax)*pelsPerUnitx;
33:       // got bounding rect, see what area it is in.
34:       PadPage &pPage = this->m_pages[m_pageIndex];
35:
36:       ASSERT(pPage.m_drawAreas);
37:       i = 0;
38:       BOOL done = FALSE;
39:       PadDrawArea *pdrawArea, *foundDrawArea = NULL;
40:       CArray<PadDrawArea, PadDrawArea&> *drawAreas = pPage.m_drawAreas;
41:
42:       for (i = 0; i < (UINT)drawAreas->GetSize( ); i++)
43:       {
44:           pdrawArea = &drawAreas->ElementAt(i);
45:           if (pdrawArea->ContainsStroke(bounds))
46:           {
47:               foundDrawArea = pdrawArea;
48:               break;
49:           }
50:       }
51:
52:       if (found DrawArea && foundDrawArea->m_userAreas)
53:       {
54:           PadArea *pArea, *foundArea = NULL;
55:
56:           UINT size = foundDrawArea->m_userAreas->GetSize( );
57:           for(i = 0; i < (UINT)size; i++)
58:           {
59:               pArea = &foundDrawArea->m_userAreas->ElementAt(i);
60:               if (pArea->ContainsStroke(bounds))
61:               {
62:                   foundArea = pArea;
63:                   break;
64:               }
65:           }
66:
67:           if (!foundArea)
68:           {
69:               TRACE0("*** Draw area found, but no user area found!!!");
70:               return (PadArea*)foundDrawArea;
71:           }
72:
73:           TRACE1("Area found name: %s", foundArea->m_name);
74:           return foundArea;
75:       }
76:       else
77:       {
78:           TRACE0("*** Draw area found, but no user area found!!!");
79:           return (PadArea *)foundDrawArea;
80:       }
81:   }
```

In particular, at line 60 above a "ContainsStroke" routine is called to determine if a particular area contains a majority of a given pen stroke.

The "ContainsStroke" routine is as follows:

```
 1:   BOOL PadArea::ContainsStroke(CRect &bounds)
 2:   {
 3:       int count = NumRectPointsInRect(this->GetRect( ), bounds);
 4:
 5:       // if it has more than two vertices, it must contain all of
 6:       the stroke rectangle
 6:       if (count > 2)
 7:           return TRUE;
 8:
 9:       // check to see if this area contain MOST of the bounds rect.
10:
11:       CRect intRect;
12:       intRect.IntersectRect(this->GetRect( ), bounds);
13:       DWORD barea = bounds.Height( ) * bounds.Width( );
14:
15:       DWORD iarea = intRect.Width( ) * intRect.Height( );
16:       // TRACE2("StrokeArea = %ld, IntersectArea = %ld \r\n",
       barea, iarea);
17:       if ((barea/2) < iarea)
18:           return TRUE;
19:       return FALSE;
20:   }
```

The above "ContainsStroke" routine determines if a given area contains a majority of the stroke rectangle. First a check is made as shown at lines 3-7 to determine if more than two points of the stroke rectangle are within the area. If the area contains more than two vertices, this indicates that the area contains all of the stroke rectangle. The remaining portion of the function commencing at line 11 determines if an area contains a majority of the stroke rectangle. The function returns "TRUE" if an area contains most of the stroke rectangle and "FALSE" otherwise.

Allowing the User to Select Alternative Words

The results of the text recognition processing described above may then be displayed to the user in the user interface (display) of the system. A user may then select particular words and edit them (e.g., in the event that the words generated as a result of text recognition are incorrect). The system of the present invention also provides for display of available alternative words suggested by the text recognition engine. In the presently preferred embodiment, when a user selects (e.g., clicks and holds on) an edit control, a context menu is created which is populated with alternative words (if they exist). The following "ContextMenu" routine illustrates the process for creation of the context menu:

```
 1:    void CEditCtrl::ContextMenu(CPoint point)
 2:    {
 3:        CMenu mnuCtxt;
 4:
 5:
 6:        if (!m_nMenuID)
 7:            return;
 8:
 9:        mnuCtxt.CreatePopupMenu( );
10:
11:        // ...
12:
13:        // now see if there are alternate words for word at this location
14:        int x = point.x - GetMarginWidth( );
15:        int y = point.y;
16:        CPoint curLoc;
17:        MouseToCaret(x, y, curLoc);
18:        m_nContextMenuIndex = -1;
19:        if (curLoc.y < m_vLines.GetSize( ))
20:        {
21:            Line &lLine = m_vLines[curLoc.y];
22:
23:            // The wordAlternates structure contains the info about alternate
                words for a given word starting at a given line index
24:
25:            if (lLine.wordAlternates)
26:            {
27:                m_ptCaretPos = curLoc;
28:
29:                CPoint start, end;
30:                // from the given word point location, we get the word bounds
31:                GetWordPoints(start, end);
32:
33:                WordAltInfo *p_wordInfo = NULL;
34:                BOOL bFound = FALSE;
35:                // then see if an alternate exists for the given word index
36:
37:                for (int i = 0; i < lLine.wordAlternates->GetSize( ); i++)
38:                {
39:                    p_wordInfo = &(lLine.wordAlternates->ElementAt(i));
40:                    int index = p_wordInfo->index;
41:                    if (index >= start.x && index <= end.x)
42:                    {
```

-continued

```
43:                        m_nContextMenuIndex = i;
44:                        break;
45:                    }
46:                }
47:                if (m_nContextMenuIndex != -1 && p_wordInfo &&
                    p_wordInfo->word Data && (p_wordInfo->wordData->numAlts > 1))
48:                {
49:                    if (menuAdded)
50:                        mnuCtxt.AppendMenu(MF_SEPARATOR, 0 , _T(" "));
51:
52:                    RecogWordData *wordData = p_wordInfo->wordData;
53:
54:                    for (i = 0; i < wordData->numAlts && i <= EM_INSERTALTLAST; i++)
55:                    {
56:                        if (i != wordData->selIndex)
57:                        {
58:                            mnuCtxt.AppendMenu(MF_ENABLED, EM_INSERTALT+i, wordData->alts[i]);
59:                            menuAdded++;
60:                        }
61:                    }
62:                }
63:                MakeCaretVisible( );
64:            }
65:        }
66:        if (menuAdded)
67:            mnuCtxt.TrackPopupMenu(TPM_LEFTALIGN|TPM_TOPALIGN, point.x, point.y, this);
68:    }
```

A call is made to "CreatePopupMenu" to create a pop-up menu as provided at line 9 above. Next, a determination is made as to whether alternative words are available at the given location by consulting a "wordAlternates" data structure. The "wordAlternates" structure contains information about alternative words for a given word starting at a given line index. The alternative words that are identified c an be displayed to the user.

Additional routines are required in order to keep the alternative word information up to date in the event the user edits any of the items. The following routines handle most of these operations for tracking alternative words for a given word:

```
 1: BOOL CEditCtrl::InsertLine(LPCTSTR text, int nLength, int nPosition, WordAltInfoArrayPtr p_wordInfo, int waiIndex)
 2: {
 3:     Line line;
 4:     if(nLength == -1)
 5:     {
 6:         if (text != NULL)
 7:             nLength = (int)_tcslen(text);
 8:     }
 9:     line.nLength = nLength;
10:     line.nMax = (nLength ? ROUND_SIZE(REAL_SIZE(nLength)): 0);
11:     // line.nBlockColor = -1;
12:     if(nLength != 0)
13:     {
14:         line.pcText = new TCHAR[line.nMax+1];
15:         if(!line.pcText)
16:             return FALSE;
17:         if(p_wordInfo)
18:         {
19:             line.wordAlternates = new WordAltInfoArray;
20:             for (int i = 0; i < p_wordInfo->GetSize( ); i++)
```

```
 21:        {
 22:            if(waiIndex)
 23:            {
 24:                WordAltInfo item = p_wordInfo->ElementAt(i);
 25:                int lastIndex = waiIndex + nLength;
 26:                if (item.index >= waiIndex && item.index <= lastIndex)
 27:                {
 28:                    item.index -= waiIndex;
 29:                    line.wordAlternates->Add(item);
 30:                }
 31:            }
 32:            else
 33:            {
 34:                WordAltInfo item = p_wordInfo->ElementAt(i);
 35:                if (item.index < nLength)
 36:                    line.wordAlternates->Add(item);
 37:            }
 38:        }
 39:    }
 40:    memset(line.pcText, 0, REAL_SIZE(nLength+1));
 41:    memcpy(line.pcText, (LPCTSTR)text, REAL_SIZE(nLength));
 42: }
 43:
 44:    if (nPosition == -1)
 45:        m_vLines.Add(line);
 46:    else
 47:    {
 48:        m_vLines.InsertAt(nPosition, line);
 49:    }
 50:    nLength = (int)CaretOffsetLine(nPosition == -1 ? (int)m_vLines.GetSize() - 1 : nPosition, nLength);
 51:
 52:    if (nLength > m_nLongestLine)
 53:    {
 54:        m_nLongestLine = nLength;
 55:        SetupHScroller();
 56:    }
 57:    return TRUE;
 58: }
 59:
 60: BOOL CEditCtrl::InsertTextEx(int nLine, int nColumn, LPCTSTR lpsz-
Text, CPoint *ptNewPos, WordAltInfoArrayPtr p_wordInfo)
 61: {
 62:    TCHAR *pcRemChars = NULL;
 63:    int nRemaining = 0, nCurrent = nLine, nIndex;
 64:    BOOL bError = FALSE;
 65:    WordAltInfoArrayPtr tmpWordInfo = NULL;
 66:
 67:    // First we save the characters right
 68:    // of the caret on the line we start
 69:    // the insert on.
 70:    if (m_vLines.GetSize() > nLine)
 71:    {
 72:        Line &lLine = m_vLines[nLine];
 73:        tmpWordInfo = lLine.wordAlternates;
 74:        // Any text?
 75:        // . . .
 76:        int cumulative = 0;
 77:        while (1)
 78:        {
 79:            // Reset index.
 80:            nIndex = 0;
 81:
 82:            // Iterate the text until we reach a line
 83:            // break or the end of the text.
 84:            int width = nColumn;
 85:            while (lpszText[nIndex] != _T('\0')
 86:                && lpszText[nIndex] != _T('\r')
 87:                && lpszText[nIndex] != _T('\n')
 88:                )
 89:                nIndex++;
 90:
 91:            // Are we still on the current line?
 92:            if (nCurrent == nLine)
 93:            {
 94:                // Yes. Append the characters.
 95:                bError = !AppendText(lpszText, nCurrent, nIndex, p_wordInfo);
 96:                // not a new line, but has alternate word info?
 97:                if (!bError && tmpWordInfo)
 98:                {
 99:                    int size = tmpWordInfo->GetSize();
100:                    for (int i = 0; i < size; i++)
101:                    {
102:                        // add in new characters
103:                        if (tmpWordInfo->ElementAt(i).index > nColumn)
104:                            tmpWordInfo->ElementAt(i).index += nIndex;
105:                        TRACE1("INSERRTTEXTEX::WordInfo index: %d\r\n", tmpWordInfo->ElementAt(i).index);
106:                    }
107:                }
108:            }
109:            else
110:            {
111:                // Insert a new line.
112:                bError = !InsertLine(lpszText, nIndex, nCurrent, p_wordInfo, cumulative);
113:            }
114:
115:            // Did we reach the end of the string?
116:            if (lpszText[nIndex] == _T('\0'))
117:            {
118:                // Setup the new position.
119:                if (ptNewPos != NULL)
120:                {
121:                    ASSERT(m_vLines.GetUpperBound() >= nCurrent);
122:                    Line &line = m_vLines[nCurrent];
123:                    ptNewPos->x = line.nLength;
124:                    ptNewPos->y = nCurrent;
125:                }
126:
127:                // Any remaining characters to add?
128:                if (pcRemChars)
129:                    bError = !AppendText(pcRemChars, nCurrent, nRemaining);
130:                break;
131:            }
132:            // Next line . . .
133:            nCurrent++;
134:            nIndex++;
135:            // Newline?
136:            if (lpszText[nIndex] == _T('\n') || lpszText[nIndex] == _T('\r'))
137:                nIndex++;
138:
139:            cumulative += nIndex;
140:            // Adjust pointer.
141:            lpszText += nIndex;
142:        }
143:
144:        // . . .
145:    }
146: }
147:
148: BOOL CEditCtrl::AppendText(LPCTSTR lpszText, int nLine, int nLength, WordAltInfoArrayPtr p_wordInfo, int wordAltIndexStart)
149: {
150:    // Length passed?
151:    // . . .
152:
153:    // Any text to append?
154:    // . . .
155:
156:    // checks here to see if a newly inserted item is a substitute
word due to the user selecting an alternate from the Context Menu
157:    if (p_wordInfo)
```

```
158:    {
159:        // inserting substitute word?
160:        if (ILine.wordAlternates)
161:        {
162:            // no need to adjust anything here
163:            // just add the new wordInfo stuff
164:            int size = p_wordInfo->GetSize( );
165:            for (int i = 0; i < size; i++)
166:                ILine.wordAlternates->Add(p_wordInfo->ElementAt(i));
167:        }
168:        else // no, this is new
169:        {
170:            // adjust index's per nLength
171:            int size = p_wordInfo->GetSize( );
172:            if (ILine.nLength)
173:            {
174:                for (int i = 0; i < size; i++)
175:                {
176:                    p_wordInfo->ElementAt(i).index += ILine.nLength;
177:                    TRACE1("APPENDTEXT::wordInfo index = %d\r\n" p_wordInfo->ElementAt(i).index);
178:                }
179:            }
180:            ILine.wordAlternates = new WordAltInfoArray;
181:
182:            // is this a previously existing line?
183:            if (wordAltIndexStart)
184:            {
185:                int len = ILine.nLength;
186:                for (int i = 0; i < size; i++)
187:                {
188:                    // see if this has any words with alternates
189:                    // this would be alts with index's greater than wordAltIndexStart
190:                    // include len that was added on above
191:                    if (p_wordInfo->ElementAt(i).index > (wordAltIndexStart + len))
192:                        ILine.wordAlternates->Add(p_wordInfo->ElementAt(i));
193:                }
194:            }
195:            else  // these seperated for speed's sake, even though possible to combine lines above with this.
196:                for (int i = 0; i < size; i++)
197:                    ILine.wordAlternates->Add(p_wordInfo->ElementAt(i));
198:        }
199:    }
200:    // . . .
201: }
```

If the user cuts, pastes, deletes, or performs other similar actions, these changes must be tracked so that the indexes stay associated with the correct words, even if such words have been modified by the user. In the presently preferred embodiment, an item is only dropped if the first letter of the word is deleted. However, if the user issues a command to "undo" the deletion of the first letter, the item is re-added. Usually, alternative word information is created when a new line is inserted, as the code doing the insertion generally passes in an array containing alternative word information.

Constructing an Event

Areas of a paper planning page may be associated with particular events (or objects) such as appointments, tasks, and the like. The following portion of an "OnInitDialog" routine determines whether an event should be created based on entries made by the user in particular areas of a paper planning page:

```
 1: BOOL CSelectItemsDlg::OnInitDialog( )
 2: {
 3:     // . . .
 4:     SYSTEMTIME sysTime;
 5:     CString strText;
 6:     COleDateTime dt = COleDateTime::GetCurrentTime( );
 7:     dt.GetAsSystemTime(sysTime);
 8:
 9:     // Is there any "real" data?
10:     if (g_padInfo && gpadInfo->m_pages.GetSize( ) > 0)
11:     {
12:         UINT nSize = g_padInfo->m_pages.GetSize( );
13:         for(UINT i = 0; i < nSize; i++)
14:         {
15:             PadPage *page = &g_padInfo->m_pages.ElementAt(i);
16:             ASSERT(page);
17:             UINT pdSize = page->m_drawAreas->GetSize( );
18:             for (UINT j=0; j < pdSize; j++)
19:             {
20:                 PadDrawArea &pdArea = page->m_drawAreas->ElementAt(j);
21:                 if (pdArea.m_userAreas)
22:                 {
23:                     UINT uaSize = pdArea.m_userAreas->GetSize( );
24:                     for (UINT k = 0; k < uaSize; k++)
25:                     {
26:                         PadArea &uaArea = pdArea.m_userAreas->ElementAt(k);
27:                         if ((uaArea.m_strokes != NULL) && (uaArea.m_strokes>GetSize( )))
28:                         {
29:                             CString aName = uaArea.m_name;
30:                             if (aName.Left(11).CompareNoCase(L"appointment") == 0)
31:                             {
32:                                 CFusionEvent* pEvent = new CFusionEvent;
33:                                 CTime curDate(sysTime);
34:                                 if (page->m_appInfoAreas)
35:                                 {
36:                                     int aiSize = page->m_appInfoAreas->GetSize( );
37:                                     PadArea *aiArea;
38:                                     BOOL bFound = FALSE;
39:                                     for (int ai = 0; ai < aiSize; ai++)
40:                                     {
41:                                         aiArea = &(page->m_appInfoAreas->ElementAt(ai));
42:                                         if (aiArea>m_name == L"date")
43:                                         {
44:                                             bFound = TRUE;
45:                                             break;
46:                                         }
47:                                     }
48:                                     if (bFound)
49:                                     {
50:                                         curDate = StrToCTime(aiArea->m_value);
51:                                     }
52:                                 }
53:                                 // time should be the last char or two at the end of the area name.
54:                                 int curTime = _wtoi((LPCTSTR)aName.Right(2));
55:                                 curDate = CTime(curDate.GetYear( ), curDate.GetMonth( ), curDate.GetDay( ), curTime, 0, 0);
56:                                 strText = uaArea.ExpandStringData( );
57:                                 pEvent->SetSubject(strText);
58:                                 TRACE1("Subject: %s\r\n", (LPCTSTR)strText);
59:                                 pEvent->SetIcon(eNewAppoint);
60:                                 SYSTEMTIME tTime;
61:                                 curDate.GetAsSystemTime(tTime);
62:                                 pEvent->SetStartDT(tTime);
63:                                 curDate = CTime(curDate.GetYear( ), curDate.GetMonth( ), curDate.GetDay( ), curTime+1, 0, 0);
```

```
64:              curDate.GetAsSystemTime(tTime);
65:              pEvent->SetEndDT(tTime);
66:              pEvent->SetRecordDT(sysTime);
67:              pEvent->m_padPageIndex = i;
68:              pEvent->m_padArea = &uaArea;
69:              __int64 createTime = page->m_createTime;
70:
71:              ULARGE_INTEGER uli = *(ULARGE_INTEGER *)&createTime;
72:              FILETIME ft = *(FILETIME *)&uli;
73:
74:              SYSTEMTIME sysTime;
75:              FileTimeToSystemTime(&ft, &sysTime);
76:
77:              pEvent->SetRecordDT(sysTime);
78:              m_ItemsList.AddItem(pEvent);
79:
80:              // we found an appointment.
81:           }
82:           else if (aName.Left(4).CompareNoCase(L"task") == 0)
83:           {
84:              // we found a task
85:              CFusionTask *pTask = new CFusionTask;
86:              strText = uaArea.ExpandStringData( );
87:              pTask->SetSubject(strText);
88:              TRACE1("Subject: %s\r\n", (LPCTSTR)strText);
89:              pTask->SetIcon(eTask);
90:              pTask->SetRecordDT(sysTime);
91:              pTask->m_padArea = &uaArea;
92:              pTask->m_padPageIndex = i;
93:              __int64 createTime = page->m_createTime;
94:
95:              ULARGE_INTEGER uli = *(ULARGE_INTEGER *)&createTime;
96:              FILETIME ft = *(FILETIME *)&uli;
97:
98:              SYSTEMTIME sysTime;
99:              FileTimeToSystemTime(&ft, &sysTime);
100:
101:             pTask->SetRecordDT(sysTime);
102:
103:             CTime curDate(sysTime);
104:             if (page->m_appInfoAreas)
105:             {
106:                int aiSize = page->m_appInfoAreas->GetSize( );
107:                PadArea *aiArea;
108:                BOOL bFound = FALSE;
109:                for (int ai = 0; ai < aiSize; ai++)
110:                {
111:                   aiArea = &(page->m_appInfoAreas->ElementAt(ai));
112:                   if (aiArea->m_name == L"date")
113:                   {
114:                      bFound = TRUE;
115:                      break;
116:                   }
117:                }
118:                if (bFound)
119:                {
120:                   curDate = StrToCTime(aiArea->m_value);
121:                }
122:             }
123:           }
124:           SYSTEMTIME tTime;
125:           curDate.GetAsSystemTime(tTime);
126:           // pTask->SetStartDT(tTime);
127:
128:           m_ItemsList.AddItem(pTask);
129:         }
130:         }
131:         else if (aName.Left(4).CompareNoCase(L"note") == 0)
132:         {
133:            // we found a note
134:            CFusionNote *pNote = new CFusionNote;
135:            strText = uaArea.ExpandStringData( );
136:            pNote->SetSubject(strText);
137:            TRACE1("Subject: %s\r\n", (LPCTSTR)strText);
138:            pNote->SetIcon(ePlainNote);
139:            pNote->SetRecordDT(sysTime);
140:            pNote->m_padPageIndex = i;
141:            pNote->m_padArea = &uaArea;
142:            __int64 createTime = page->m_createTime;
143:
144:            ULARGE_INTEGER uli = *(ULARGE_INTEGER *)&createTime;
145:            FILETIME ft = *(FILETIME *)&uli;
146:
147:            SYSTEMTIME sysTime;
148:            FileTimeToSystemTime(&ft, &sysTime);
149:
150:            pNote->SetRecordDT(sysTime);
151:            m_ItemsList.AddItem(pNote);
152:         }
153:      }
154:    }
155:   }
156:  }
157: }
158: }
159: }
```

The strokes and word data have already been sorted into page and/or PAD areas as previously described. These areas themselves may be associated with a particular type of event or action (e.g., an appointment or a task object). By entering information in these particular areas of a planning page, the user may create an event such as an appointment or a task. The above portion of an "OnInitDialog" routine goes through and finds each area by type. If the user has made entries in the area, the appropriate type of event is created.

Sending Resultant Event to Database

After an event is created, it may be sent to the system's database. The system currently includes a Pocket Outlook Object Model (POOM) database. Each type class, such as "CFusionEvent" for example, has a "WriteToOutlook" function similar to the following "WriteToOutlook" method. This method is called when the user clicks on a "Send to Outlook" button or similar menu item:

```
1:   bool CFusionEvent::WriteToOutlook( void* pOutlookManager )
2:   {
3:      bool bResult = true;
4:      CFWPOOMManager* pManager = (CFWPOOMManager*)pOutlookManager;
5:      IAppointment *pAppointment = NULL;
6:      HRESULT hr = S_OK;
7:
8:      if( !pManager->Initialized( ) )
9:         return false;
10:
11:     // Create an event to receive the new data
12:     hr = pManager->GetApplication( )->CreateItem( olAppointmentItem, (IDispatch **)&pAppointment; );
13:
```

-continued

```
14:        // subject
15:        pAppointment->put_Subject((LPTSTR)(LPCTSTR)m_s
trSubject);
16:
17:        // body/description/notes
18:        pAppointment->put_Body((LPTSTR)(LPCTSTR)m_str
Body);
19:
20:        // location
21:        pAppointment->put_Location((LPTSTR)(LPCTSTR)m_
strLocation);
22:
23:        // set all day
24:        // LOOK: inputs are assumed in local, if not change
this
25:        bool bLocalTime = false;
26:        if (m_bAllday)
27:        {
28:            pAppointment->put_AllDayEvent(VARIANT_TRUE
);
29:            // bLocalTime = false;
30:        }
31:        else
32:        {
33:            pAppointment->put_AllDayEvent(VARIANT_FALS
E);
34:        }
35:
36:        // start date
37:        DATE date = SystemTimeToDATE( m_startDateTime
, bLocalTime,
pManager );
38:        pAppointment->put_Start(date);
39:
40:        // end date
41:        date = SystemTimeToDATE( m_endDateTime, bLoca
lTime, pManager );
42:        pAppointment->put_End(date);
43:
44:        // write to store
45:        hr = pAppointment->Save( );
46:        if( FAILED( hr ) )
47:        {
48:            goto cleanup;
49:        }
50:
51:    cleanup:
52:
53:        if( pAppointment )
54:            pAppointment->Release( );
55:
56:        if( FAILED( hr ) )
57:            bResult = false;
58:
59:        return bResult;
60:    }
```

The above "WriteToOutlook" routine conforms to the Pocket Outlook Object Model interface and provides for writing events to the database. The system of the present invention includes a database for storing, retrieving, and searching data objects handled by the system. These data objects typically include calendar events, contacts, tasks, notes, and the like.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. An integrated personal information management system, the system comprising:
   a receptacle holding at least one paper page that is capable of receiving pen strokes from a digital pen;
   a digital pen for recording pen strokes when a user writes on a particular paper page, wherein the paper page includes a particular dot pattern for use in conjunction with the digital pen for recording the user's pen strokes;
   a page identifier for identifying the particular paper page on which the user is writing; and
   a handheld personal information device in communication with the digital pen and page identifier for processing the recorded pen strokes associated with the particular paper page and displaying the processing results on a display screen.

2. The system of claim 1, wherein said handheld personal information device displays information responsive to input written on the particular paper page with the digital pen.

3. The system of claim 1, wherein said handheld personal information device displays information related to a calendar date in response to a user writing on a particular paper page corresponding to the calendar date.

4. The system of claim 1, wherein said handheld personal information device includes at least one interface for wireless communication with other devices.

5. The system of claim 4, wherein the digital pen includes an interface for wireless communication with said handheld personal information device.

6. The system of claim 1, wherein said handheld personal information device converts pen strokes received from the digital pen to text.

7. The system of claim 6, wherein the text is displayed on the display screen.

8. The system of claim 7, wherein the text is displayed within a few seconds after the user has written on the particular paper page enabling the user to identify any necessary corrections to the text.

9. The system of claim 7, wherein the text is automatically displayed on the display screen of the handheld personal information device without requiring any additional intervening steps.

10. The system of claim 7, wherein the user may edit the text displayed on the display screen.

11. The system of claim 7, wherein in response to the user selecting text displayed on the display screen, alternative words are displayed.

12. The system of claim 7, wherein the text is displayed together with an image representing at least a portion of the particular paper page.

13. The system of claim 1, wherein the particular paper page includes areas for entering a selected one of appointments, tasks, calendar entries, contacts, and notes.

14. The system of claim 13, wherein particular information is displayed on the display screen in response to a user selecting an area of the particular paper page with the digital pen.

15. The system of claim 13, wherein said handheld personal information device creates a particular type of record in response to a user writing in a particular area of the paper.

16. The system of claim 15, wherein the particular type of record comprises a selected one of an appointment record, a task record, an email record, a contact record, and a note record.

17. The system of claim 15 wherein a particular attribute of the record is defined in response to a user marking a designated area of a paper page.

18. The system of claim 1, wherein a user may search for information stored on said handheld personal information device by selecting an area of the particular paper page using the digital pen.

19. The system of claim 18, wherein the user may search for information by touching a handwritten entry on the particular paper page using the digital pen.

20. The system of claim 1, wherein information previously written by the user on the particular paper page on which the user is currently writing is displayed on the display screen.

21. The system of claim 1, wherein said page identifier comprises a sensing device connected to the handheld personal information device.

22. The system of claim 1, wherein said page identifier is a component of the digital pen capable of identifying the paper page on which the user is writing.

23. The system of claim 1, wherein the receptacle comprises a folder for mounting the paper pages and the handheld personal information device.

24. A method for displaying information at a portable device responsive to user input on a paper page, the method comprising:
proviing at least one paper page, each paper page capable of receiving pen strokes made using a digital pen;
recording pen strokes made by a user on a paper page using the digital pen and a page identifier identifying the paper page, wherein the paper page includes a particular dot pattern for use in conjunction with the digital pen for recording the user's pen strokes;
transferring the pen strokes and page identifier to the portable device; and
generating information for display at the portable device based on processing the pen strokes and the page identifier.

25. The method of claim 24, wherein the page identifier establishes context for processing the pen strokes.

26. The method of claim 24, wherein said portable device displays input written by the user on the paper page with the digital pen.

27. The method of claim 24, further comprising: determining a particular area of the paper page containing the pen strokes made by the user.

28. The method of claim 27, wherein a particular type of record is created in response to a user writing in a particular area of the paper page.

29. The method of claim 28, wherein the record comprises a selected one of an appointment record, a task record, an email record, a contact record, and a note record.

30. The method of claim 28, wherein a particular attribute of the record is defined in response to a user marking a designated area of the paper page.

31. The method of claim 24, wherein said transferring step includes using wireless communication.

32. The method of claim 24, wherein the portable device comprises a personal digital assistant (PDA).

33. The method of claim 24, wherein said displaying step includes displaying information related to a particular calendar date in response to a user selecting a paper page corresponding to the particular calendar date.

34. The method of claim 24, wherein said displaying step includes displaying an image representing at least a portion of a paper page containing user input entered by the user on the paper page.

35. The method of claim 24, wherein said displaying step includes displaying particular information based on a particular area of the paper page selected by the user.

36. The method of claim 35, wherein said displaying step includes displaying information previously input by the user in a particular area of the paper page in response to the user selecting the particular area using the digital pen.

37. The method of claim 36, wherein said displaying step further comprises displaying information related to the information previously input by the user.

38. The method of claim 24, wherein said displaying step includes displaying feedback regarding the pen strokes made by the user.

39. The method of claim 24, wherein said generating step includes converting pen strokes received from the digital pen to text.

40. The method of claim 39, wherein the text is displayed to the user.

41. The method of claim 39, wherein the text is displayed within a few seconds after the user has written on the paper page enabling the user to identify any necessary corrections to the text.

42. The method of claim 39, wherein the text is automatically displayed without requiring any additional intervening steps.

43. The method of claim 39, wherein the user may edit the text displayed at the portable device.

44. The method of claim 39, wherein in response to the user selecting text displayed at the portable device, alternative words are displayed.

45. A computer-readable medium having processor-executable instructions for performing the method of claim 24.

46. The method of claim 24 further comprising:
downloading a set of processor-executable instructions for performing the method of claim 24.

47. A portable personal information device, the device comprising:
at least one paper page, each paper page containing printed areas for receiving pen strokes when a user writes using a digital pen;
a page identifier for identifying the paper page on which the user is writing;
a digital pen for recording pen stroke data when a user writes on the paper page and transferring the pen stroke data to a processing module, wherein the paper page includes a particular dot pattern for recording pen stroke data when a user writes on the paper page using the digital pen;
a processing module for generating information for display based on processing the pen stroke data and the page identifier; and
a display module for displaying information generated by the processing module.

48. The device of claim 47, wherein the paper page includes printed calendar information.

49. The device of claim 48, wherein the paper page includes a selected one of appointments, tasks, emails, contacts, and notes.

50. The device of claim 47, wherein said digital pen transfers pen stroke data to the processing module using wireless communication.

51. The device of claim 47, wherein said processing module generates information related to a particular calendar date in response to a user selecting a paper page corresponding to the particular calendar date.

52. The device of claim 47, wherein said processing module retrieves information previously written by the user on the paper page when the user selects the paper page.

53. The device of claim 52, wherein said display module displays the information previously input by the user.

54. The device of claim 47, wherein said processing module converts pen strokes received from the digital pen to text.

55. The device of claim 54, wherein the text is displayed by the display module.

56. The device of claim 54, wherein the text is displayed within a few seconds after the user has written on the paper page enabling the user to identify any necessary corrections to the text.

57. The device of claim 54, wherein the text is automatically displayed by the display module without requiring any additional intervening steps.

58. The device of claim 54, wherein the user may edit the text displayed by the display module.

59. The device of claim 54, wherein in response to the user selecting text displayed by the display module, alternative words are displayed.

60. The device of claim 47, wherein the user may search for information stored on the portable personal information device by selecting an area of the paper page using the digital pen.

61. The device of claim 47, wherein the user may search for information by touching a handwritten entry on the paper page using the digital pen.

* * * * *